(12) United States Patent
Duong

(10) Patent No.: US 8,144,825 B1
(45) Date of Patent: Mar. 27, 2012

(54) PREDICTING CLOCK PERIOD IN A SEMICONDUCTOR DEVICE

(75) Inventor: Anthony T. Duong, Saratoga, CA (US)

(73) Assignee: Xilinx, Inc., San Jose, CA (US)

( * ) Notice: Subject to any disclaimer, the term of this patent is extended or adjusted under 35 U.S.C. 154(b) by 904 days.

(21) Appl. No.: 12/018,055

(22) Filed: Jan. 22, 2008

(51) Int. Cl.
*H04L 7/00* (2006.01)

(52) U.S. Cl. ........................................ 375/354

(58) Field of Classification Search .............. 375/354, 375/371–376; 327/100, 141, 144, 147, 155, 327/156
See application file for complete search history.

(56) References Cited

U.S. PATENT DOCUMENTS

| | | | |
|---|---|---|---|
| 7,139,691 B1 | 11/2006 | Duong | |
| 7,636,907 B1 * | 12/2009 | Das et al. | 716/138 |
| 2006/0197565 A1 * | 9/2006 | Kang | 327/158 |

OTHER PUBLICATIONS

U.S. Appl. No. 12/018,992, filed Jan. 24, 2008, Duong.
U.S. Appl. No. 11/344,313, filed Jan. 30, 2006, Duong.

* cited by examiner

*Primary Examiner* — Kevin M Burd
(74) *Attorney, Agent, or Firm* — Kevin T. Cuenot; LeRoy D. Maunu

(57) ABSTRACT

A computer-implemented method of predicting a clock period within an integrated circuit can include determining configuration information for the integrated circuit (1430, 1435, 1445) and determining at least one measure of directional shift for an edge of a pulse of a reference clock signal of the integrated circuit with reference to at least one other clock signal of the integrated circuit (1440, 1450, 1460). The measure of directional shift for the edge of the pulse of the reference clock signal can be output (1475).

20 Claims, 25 Drawing Sheets

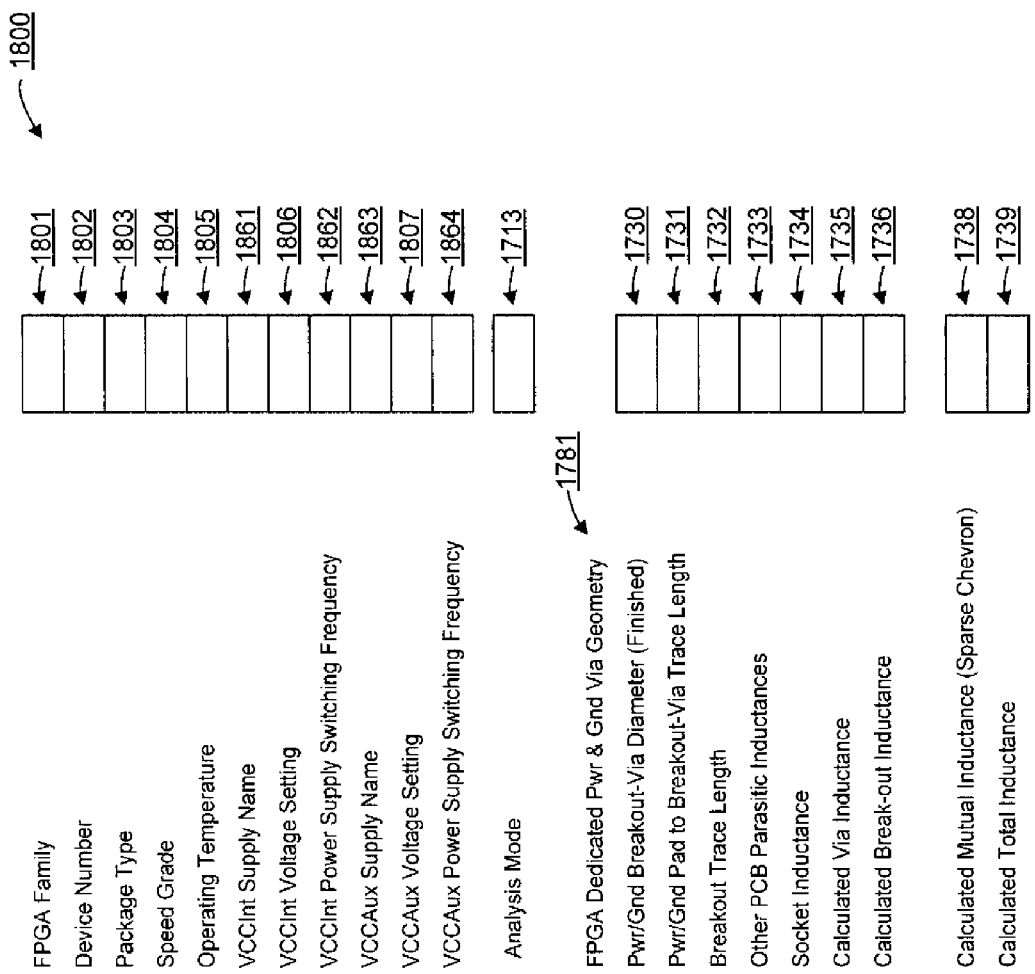

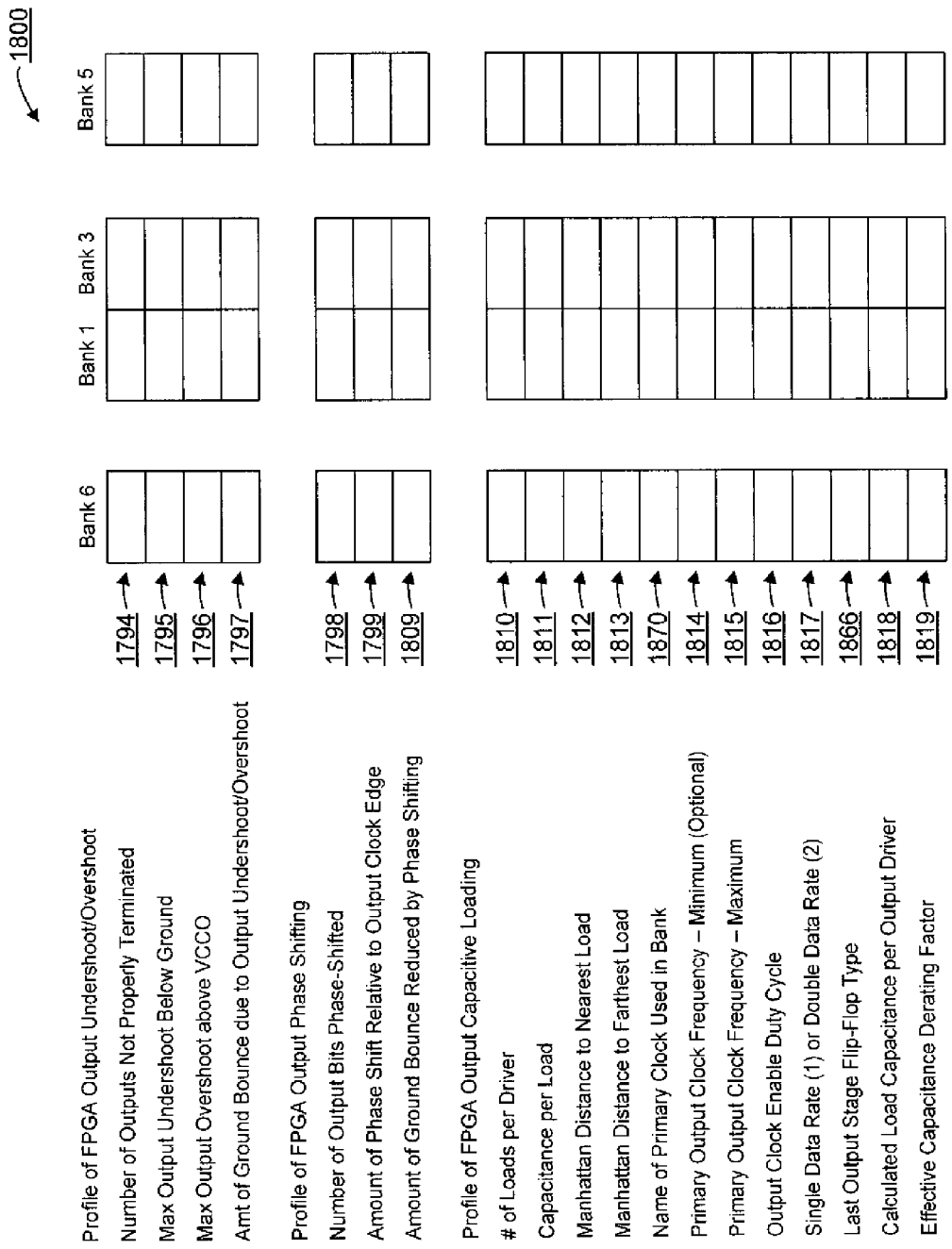

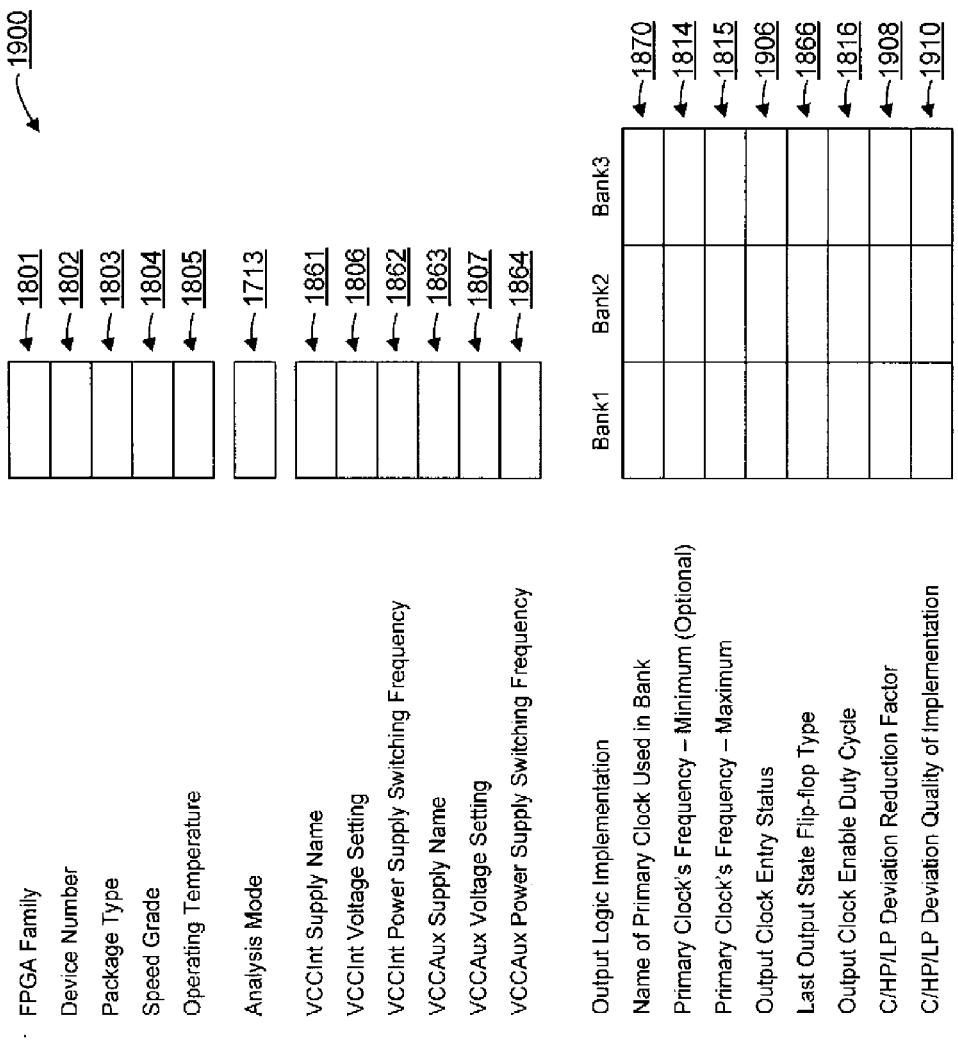

|  | PSClkA | PSClkB | PSClkC |
|---|---|---|---|
| Derived/Phase Shifted Clocks | | | | ← 1942
| Input Clock Source | | | | ← 1943
| Max/Min Frequency | | | | ← 1944
| Input Clock Frequency | | | | ← 1945
| DPS Mode | | | | ← 1946
| DPS Setting | | | | ← 1947
| C/HP/LP Deviation Limit | | | | ← 1948
| C/HP/LP Deviation Status | | | | ← 1949
| Peak C/HP/LP Deviation | | | | ← 1950
| Nominal C/HP/LP Deviation | | | | ← 1951
| Min C/HP/LP Deviation | | | | ← 1952
| Peak C/HP/LP Deviation UI | | | | ← 1953
| Nominal C/HP/LP Deviation UI | | | | ← 1954
| Min C/HP/LP Deviation UI | | | | ← 1960
| C/HP/LP Period – for Minimum Clock Frequency (Optional) | | | | ← 1962
| C/HP/LP Period – for Maximum Clock Frequency | | | | ← 1964
| C/HP/LP Period UI – for Minimum Clock Frequency | | | | ← 1966
| C/HP/LP Period UI – for Maximum Clock Frequency | | | |

FIG. 15B-4

| | PSClkA | PSClkB | PSClkC | |
|---|---|---|---|---|
| Output Logic Bit Rates | | | | ←1913 |
| Minimum Serial Bit Rate | | | | ←1914 |
| Maximum Serial Bit Rate | | | | ←1786 |
| Max Output Ground Bounce Allowed | | | | ←1831 |
| Bank SSO Allowance | | | | |
| Bank SSO Utilization | | | | ←1832 |
| Effective Ground Bounce Level | | | | ←1915 |
| Rising Edge of Clock Bit Rates | | | | ←1916R |
| Minimum Serial Bit Rate | | | | ←1917R |
| Maximum Serial Bit Rate | | | | ←1918R |
| Effective # Flops Driven | | | | |
| Falling Edge of Clock Bit Rates | | | | ←1916F |
| Minimum Serial Bit Rate | | | | ←1917F |
| Maximum Serial Bit Rate | | | | ←1918F |
| Effective # Flops Driven | | | | |

FIG. 15B-5

PREDICTING CLOCK PERIOD IN A SEMICONDUCTOR DEVICE

FIELD OF THE INVENTION

The embodiments disclosed herein relate to integrated circuit devices (ICs). More particularly, the embodiments relate to predicting clock period within an IC.

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAMs), multipliers, digital signal processing blocks (DSPs), processors, clock managers, delay lock loops (DLLs), and so forth.

Another type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include, but are not limited to, these exemplary devices and further can include devices that are only partially programmable.

Any IC, whether or not a PLD, is affected by jitter. Jitter refers to the deviation in, or displacement of, some aspect of the pulses in a digital signal. There are a variety of different types of jitter. For example, one type is peak-to-peak jitter. Typically, peak-to-peak jitter is defined as the difference between the earliest edge of a pulse and the latest edge of a pulse. This technique for measuring jitter is generally accepted and provides what is usually considered the "worst case" jitter. Measuring jitter in this manner, however, may lead to situations in which jitter is overstated. Overstating jitter can influence many aspects of timing analysis and design of ICs. This may lead to situations in which implementation tools are overly-constrained, or overly safe, in terms of delay estimation to overcome the effects of jitter.

SUMMARY OF THE INVENTION

The embodiments disclosed herein relate to predicting clock period within an integrated circuit device (IC). One embodiment of the present invention can include a computer-implemented method of predicting a clock period within an IC. The method can include determining configuration information for the IC and determining at least one measure of directional shift for an edge of a pulse of a reference clock signal of the IC. The measure of directional shift can be determined with reference to at least one other clock signal of the IC and the configuration information. The method can include outputting the measure of directional shift for the edge of the pulse of the reference clock signal.

The computer-implemented method further can include estimating a period for the reference clock signal according to the measure of directional shift.

In one embodiment, determining a measure of directional shift can include determining a measure of left shift. A minimum period of the reference clock signal can be estimated according to the measure of left shift. In another embodiment, determining at least one measure of directional shift can include determining a measure of right shift. A maximum period of the reference clock signal can be estimated according to the measure of right shift.

Determining at least one measure of directional shift can include determining a measure of input/output bank induced directional shift for the edge of the reference clock signal that depends upon a number of input/output banks associated with the reference clock signal. Determining at least one measure of directional shift further can include determining a measure of configurable logic block induced directional shift for the edge of the reference clock signal that depends upon a number of configurable logic blocks driven by the reference clock signal.

Determining a measure of directional shift also can include determining a measure of directional shift for a low pulse of the reference clock signal and/or for a high pulse of the reference clock signal.

Another embodiment of the present invention can include a computer-implemented method of predicting directional shift of a clock edge within an IC. The method can include obtaining frequencies of clock signals of an IC design, obtaining clock enable duty cycles in association with the clock frequencies, and determining directional shifts of a selected edge of a pulse of at least one clock signal, at least in part, responsive to the clock enable duty cycles and the clock frequencies. An indication of the directional shift of the pulses of the clock signals can be output in association with the clock frequencies.

The computer-implemented method can include selecting the directional shift to be left shift of a selected edge or right shift of a selected edge of a pulse of a clock signal. The computer-implemented method also can include determining an effective serial bit rate for each of the clock frequencies and generating a clock edge directional shift susceptibility array for the clock frequencies over a selected range of clock frequencies.

A threshold can be set to which one item of the clock edge directional shift susceptibility array is compared. A status of one or more of the deviations induced by one clock onto a plurality of other clocks, or a deviation induced by a plurality of clock domains onto a selected clock can be indicated.

Yet another embodiment of the present invention can include a computer program product including a computer-usable medium having computer-usable program code that, when executed by an information processing system, causes the information processing system to perform the various steps and/or functions disclosed herein.

BRIEF DESCRIPTION OF THE DRAWINGS

FIGS. 15A-1 through 15B-6 are diagrams illustrating a visual interface for a circuit design tool in accordance with another embodiment of the present invention.

FIGS. 16-1 through 16-2 are diagrams illustrating a visual interface for a circuit design tool in accordance with another embodiment of the present invention.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

There are many types of complex integrated circuits (ICs) for which external factors affect performance. General categories of these complex ICs may include system-on-chips (SoCs), processors, application specific ICs (ASICs), and application specific standard products (ASSPs), among others. The terms "include" and "including," as used herein, mean including without limitation. Examples of such ICs can include microprocessors, digital signal processors (DSPs), communication ICs including framers and cross-connects, programmable logic devices (PLDs), memories, and graphic signal processors (GSPs).

One type of complex programmable logic device (PLD) IC is a Field Programmable Gate Array (FPGA). An FPGA is used throughout this specification by way of example to better illustrate the various embodiments of the present invention. It should be appreciated, however, that the embodiments disclosed herein can be applied to other types of ICs. From the exemplary FPGA architecture discussed, it will be apparent that the embodiments described herein can be applied to any IC that is subject to one or more performance affecting factors, e.g., clock jitter.

The embodiments disclosed herein relate to predicting the period of a clock signal within an IC. Performance affecting factors, such as jitter, can be predicted with reference to an IC. The prediction of jitter allows an estimate of the variation in the period of a clock signal of the IC to be performed. In accordance with the embodiments disclosed herein, more accurate prediction of jitter can be performed by independently determining measures of left and/or right shift of edges of clock signals. Breaking jitter prediction into left and/or right shifts allows for more accurate jitter prediction, which can lead to more efficient circuit designs that are not unduly constrained by overly conservative timing calculations.

Figure 1:
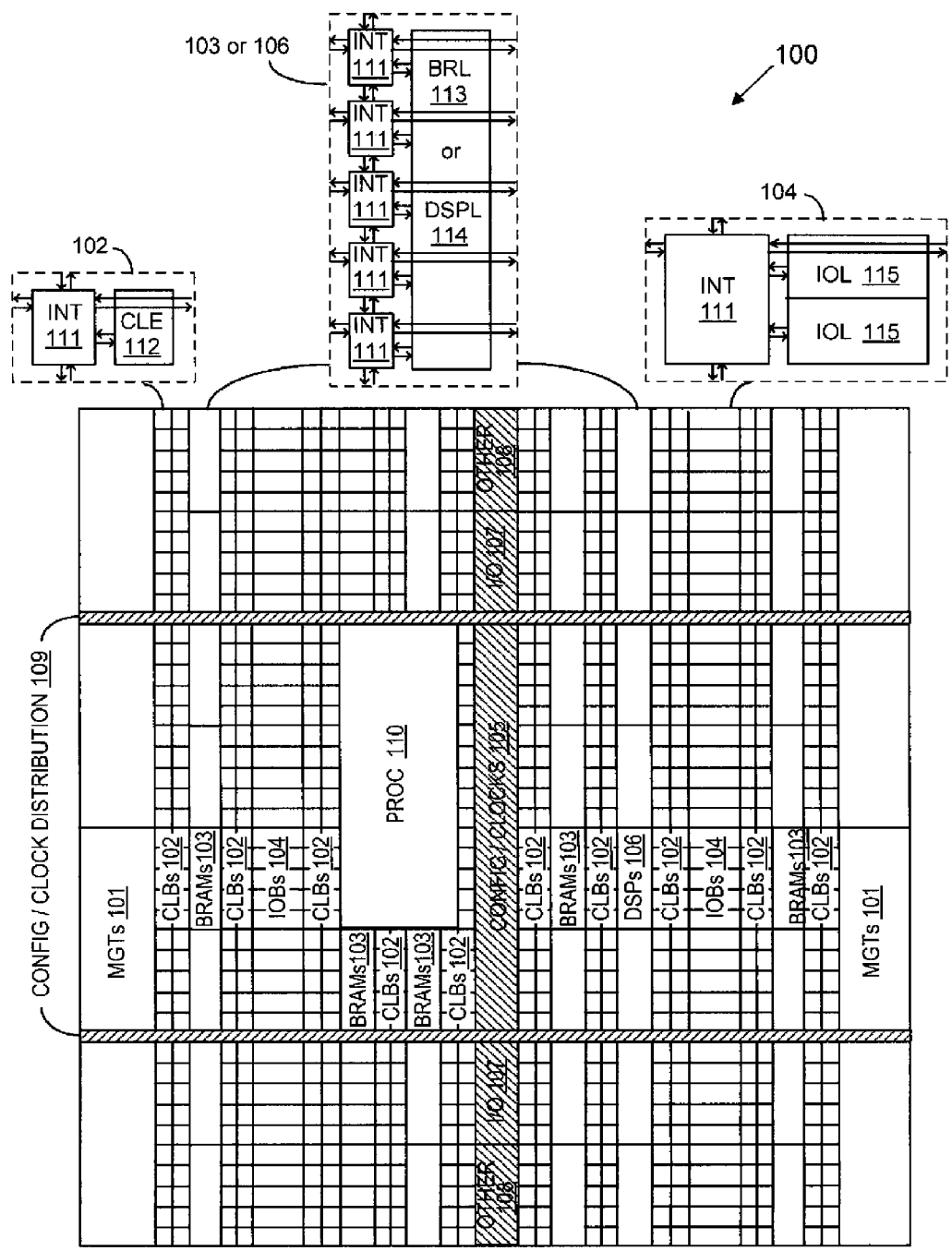
FIG. 1 is a simplified block diagram depicting an exemplary embodiment of a columnar Field Programmable Gate Array (FPGA) architecture in which one or more aspects of the invention may be implemented.

FIG. 1 illustrates an FPGA architecture 100 that includes a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output (I/O) ports 107 (e.g., configuration ports and clock ports), and other programmable logic 108 such as digital clock managers, analog-to-digital converters, system monitoring logic, and so forth. Some FPGAs also include dedicated processor blocks (PROC) 110.

In some FPGAs, each programmable tile includes a programmable interconnect element (INT) 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element (CLE) 112 that can be programmed to implement user logic plus a single programmable interconnect element 111. A BRAM 103 can include a BRAM logic element (BRL) 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL) 114 in addition to an appropriate number of programmable interconnect elements 111. An IOB 104 can include, for example, two instances of an input/output logic element (IOL) 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown crosshatched in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks or dedicated logic. For example, the processor block 110 shown in FIG. 1 spans several columns of CLBs and BRAMs.

FIG. 1 is intended to illustrate an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be, for example, a Virtex-4™ FPGA from Xilinx, Inc. of San Jose, Calif. (Xilinx and Virtex are trademarks of Xilinx, Inc. in the United States, other countries, or both.)

Figure 2:
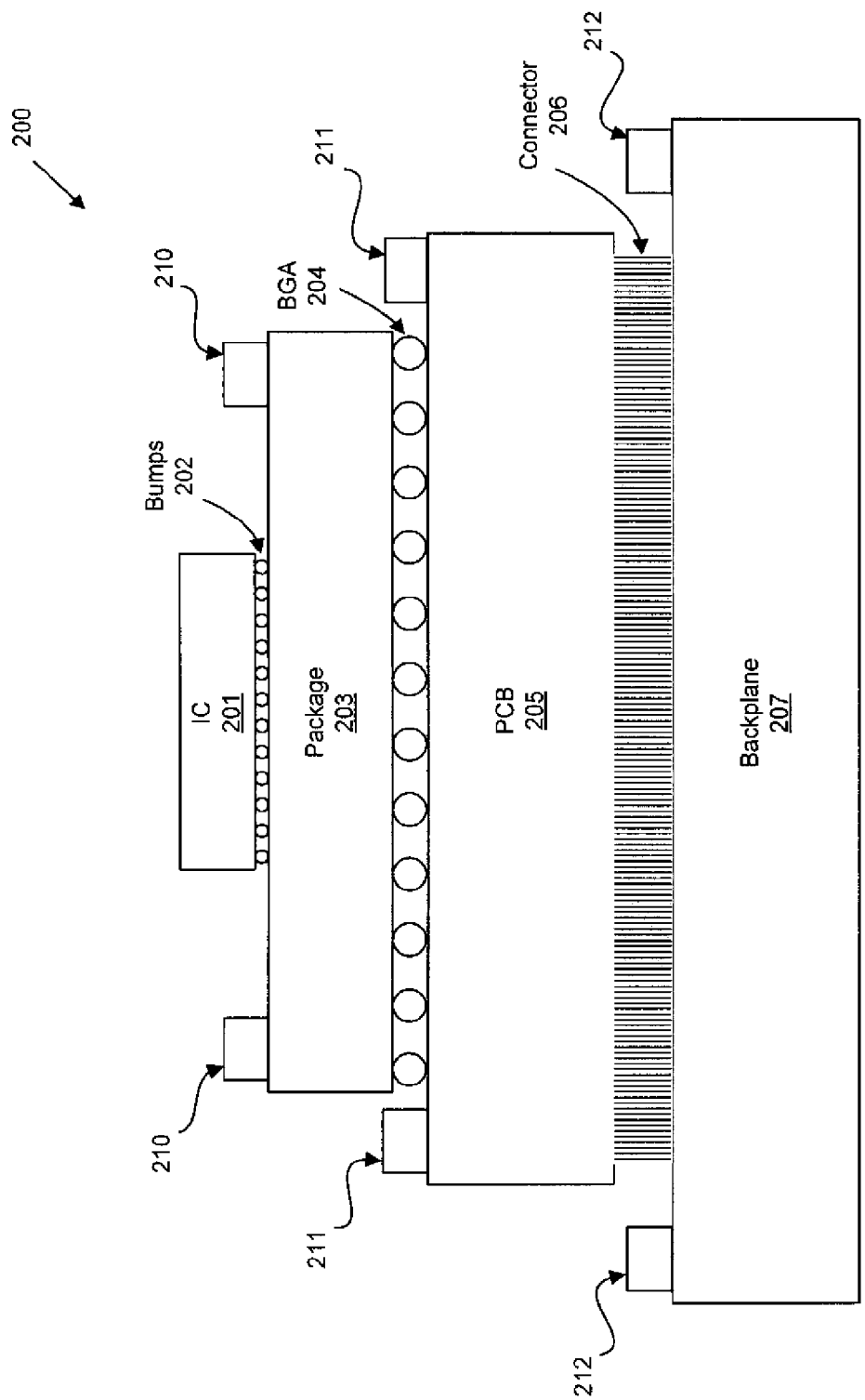
FIG. 2 is a side view depicting an exemplary embodiment of an assembly including an integrated circuit coupled to a printed circuit board (PCB).

FIG. 2 is a side view depicting an exemplary embodiment of an assembly 200 including an IC 201 coupled to a printed circuit board (PCB) 205. IC 201 may be an FPGA as illustrated in FIG. 1 or another known type of IC. Although FIG. 2 specifically identifies different types of interconnect arrays, such as solder bumps 202, ball grid array (BGA) 204 and connector 206, it should be understood that any one of these types of interconnect arrays, or any combination of two or more of these interconnect arrays, may be used.

As shown, IC 201 can be coupled to package 203 via solder bumps 202. Solder bumps 202 may be configured, or otherwise laid out, using repeated application of an interconnect pattern, as is known. Package 203, which may be made of an organic or inorganic material as is known, can be coupled to PCB 205 via BGA 204. BGA 204 may be a fine-pitch BGA. BGA 204 may be laid out in accordance with tiling with a tile, as is known.

PCB 205 may be a line card or daughter card coupled to a backplane, motherboard, or other larger PCB via connector topology 206. Thus, although a backplane 207 is used for this example, it should be understood that other types of PCBs may be used. Connector topology 206 may be configured using one or more tiles as will be described herein in further detail. Moreover, it should be appreciated that a multi-chip module can be coupled to a PCB using one or more tiles for connector topology. Furthermore, a PCB-to-mezzanine card application may be coupled using a connector topology having one or more tiles.

Although the description of the assembly 200 of FIG. 2 has been in terms of solder bumps 202, BGA 204, and connector topology 206, it should be understood that a tile, as described herein, may be used with other types of connectors for communicating information. Examples of other types of connectors can include, but are not limited to, optical connectors. Moreover, it should be appreciated that although a tile, as described herein, is used with flip-chip technology, a wirebond or other known interconnect technology may be used. Furthermore, although an example of a BGA is used, it should be understood that other connector technologies, including land grid array (LGA) and column grid array (CGA), among other known connector technologies, may be used.

To address noise owing to components external to IC 201, such as package 203, PCB 205, and backplane 207, it is known to couple decoupling capacitors to these various IC external items. For example, one or more on-package capacitors 210 may be used for to reduce noise. Moreover, one or more on-PCB capacitors 211 may be used to reduce noise. Furthermore, one or more on-backplane capacitors 212 may be used to reduce noise. The amount of capacitance used in each of these instances is application-dependent, and may be determined as described below in additional detail.

In contrast to ASICs, FPGAs need not be manufactured with a predetermined user design in view. As such, the performance of an FPGA may be affected by the types and amounts of circuitry in a user's design and the operating parameters of the user's design, among other factors. For example, response of capacitors used in a user's design may affect the power distribution system (PDS) response. This is but one example; it should be understood that there are many factors which influence performance.

Figure 4:
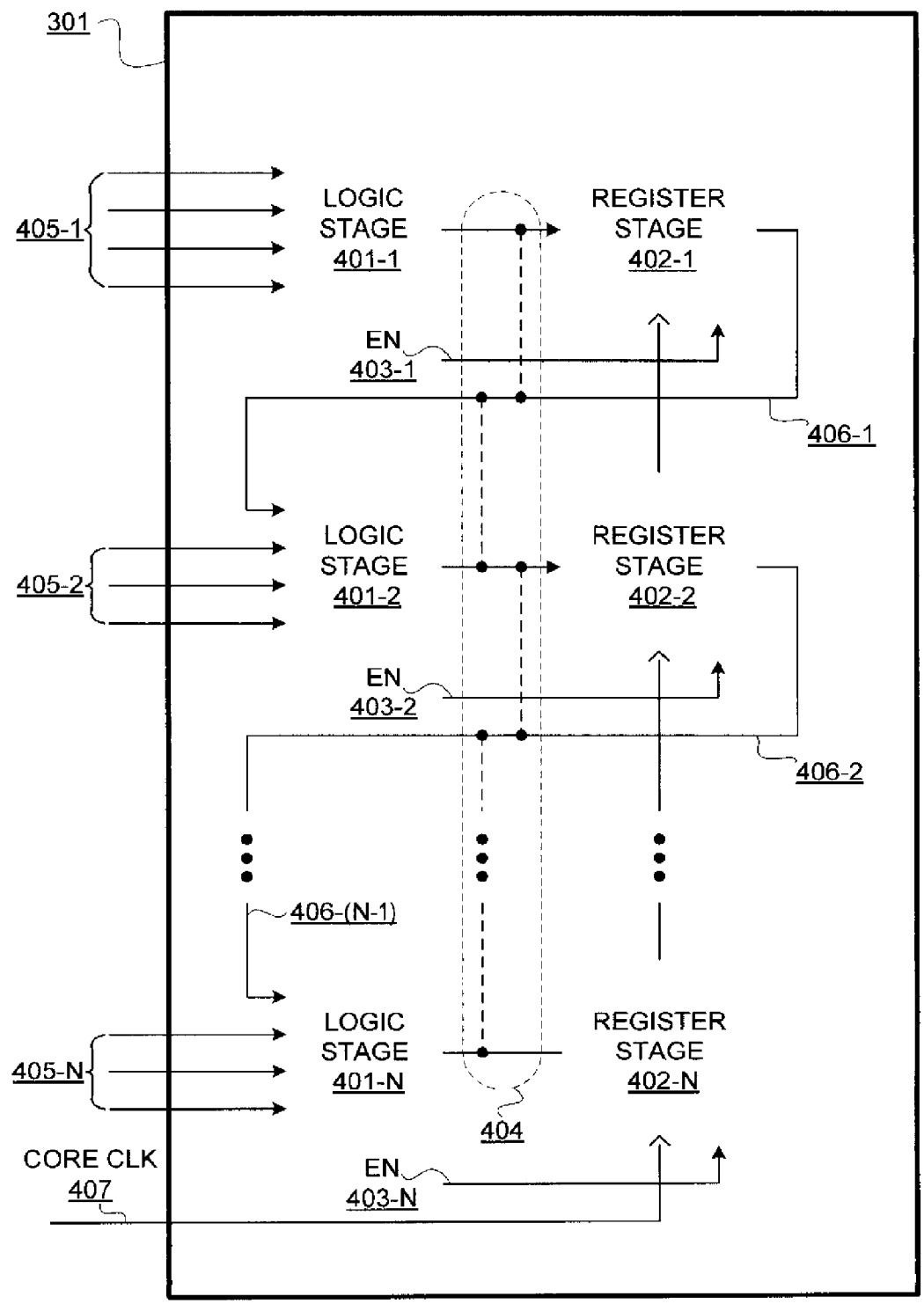
FIG. 4 is block diagram depicting an exemplary embodiment of a core logic block.
Figure 5:
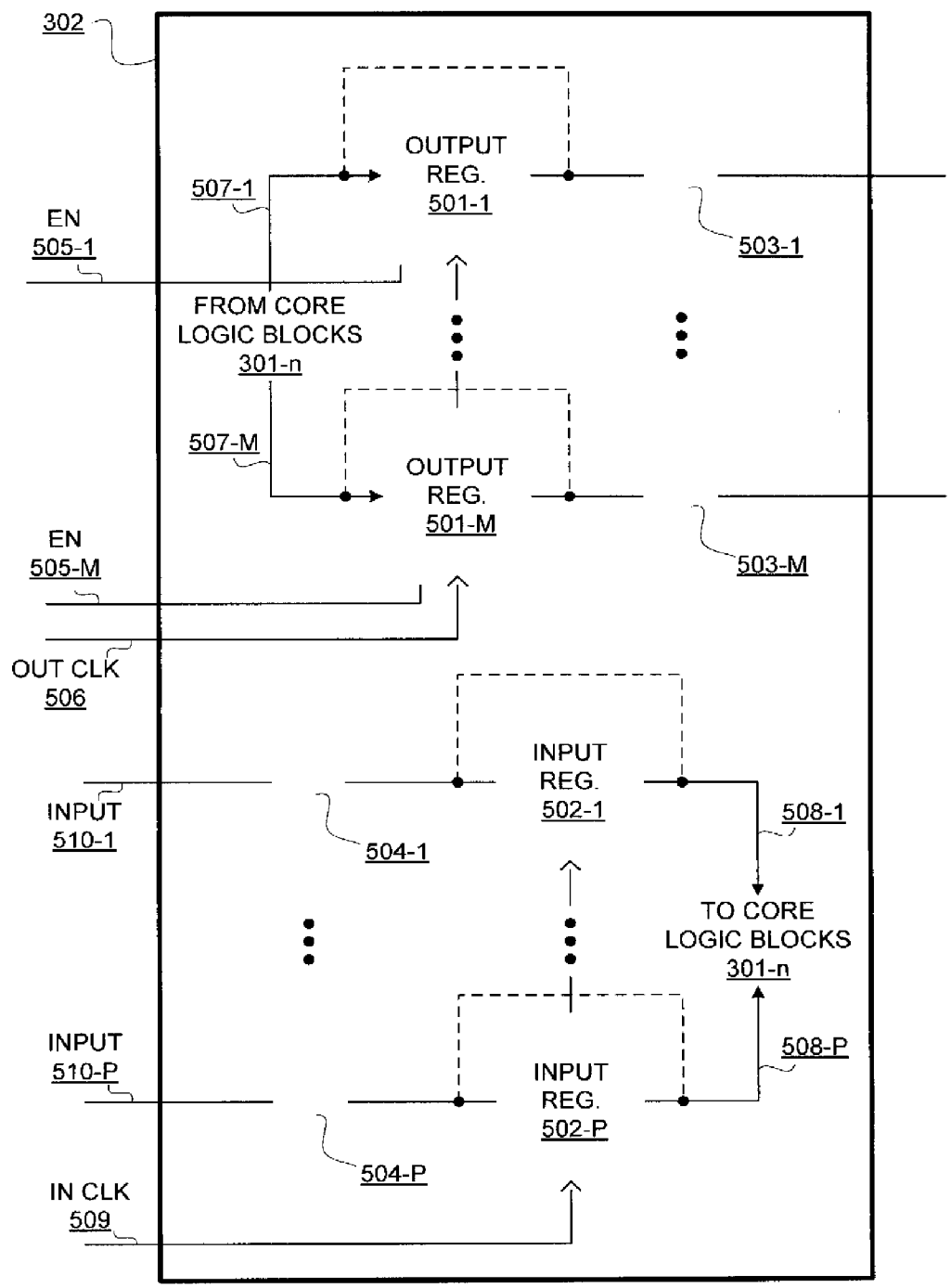
FIG. 5 is a block diagram depicting an exemplary embodiment of an input/output (I/O) block.

To account for these factors in a meaningful way, a software application should be variable to account for a significant number of these factors, as well as to allow variation thereof, to not only predict performance based on variables but also to allow such performance to be enhanced by variation of one or more factors. Though variability is particularly relevant for implementations using programmable logic, including I/O variability, variability of such factors may be at issue in non-programmable logic applications as well. To better appreciate how signaling to and from an FPGA may be related to noise management, FIGS. 3 through 5 provide examples of FPGA signaling.

Figure 3:
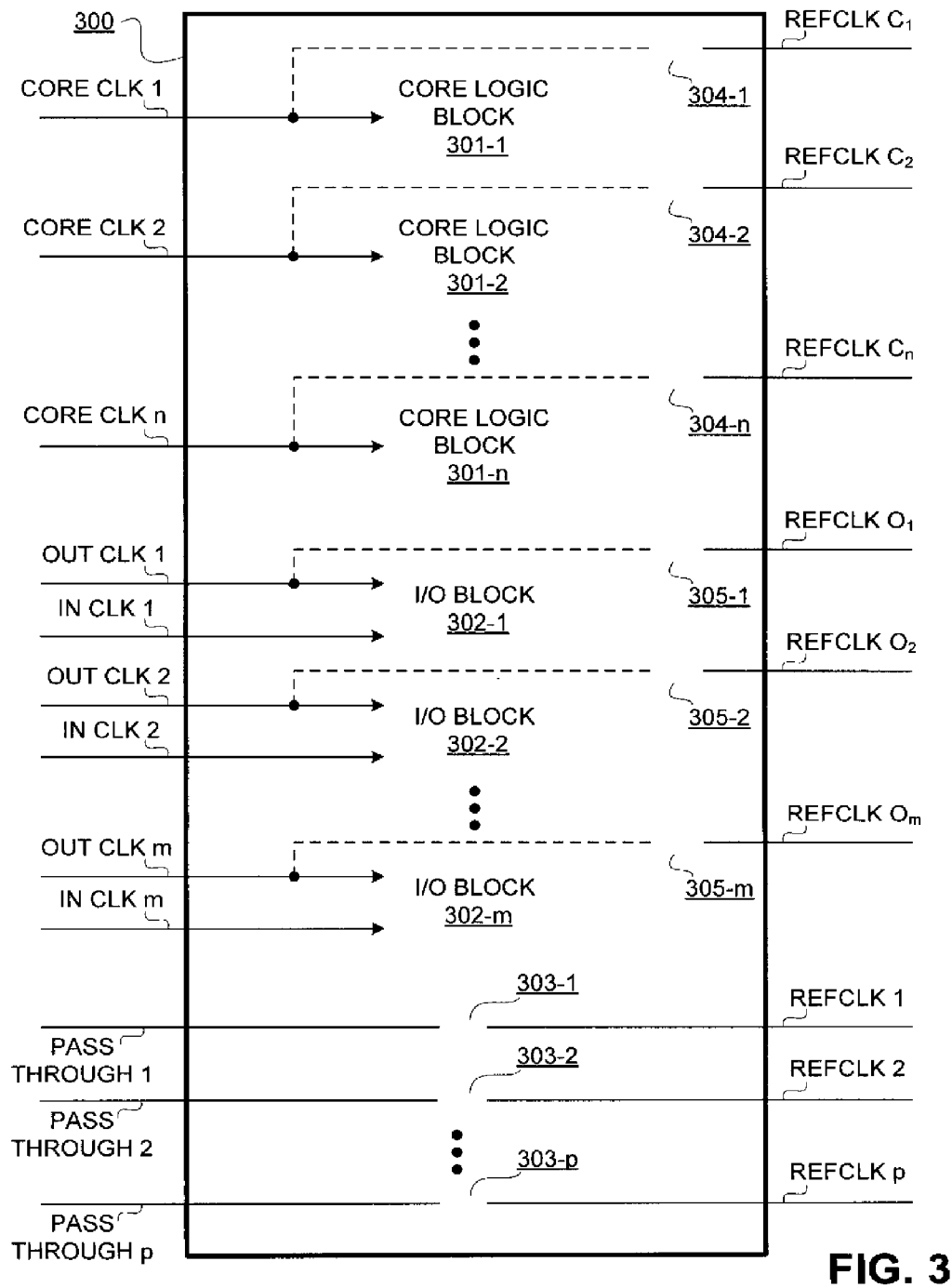
FIG. 3 is a block diagram depicting an exemplary embodiment for providing reference clock signals.

FIG. 3 is a block diagram depicting an exemplary embodiment for providing reference clock signals. As used herein, the terms "clock signal" and "clock" may be used interchangeably. Regarding FIG. 3, a portion 300 of an FPGA can include core logic blocks 301-1 through 301-n, I/O blocks 302-1 through 302-m, and pass-through output buffers 303-1 through 303-p, where m, n, and p may all be positive integers greater than one. Core logic blocks 301-1 through 301-n may be thought of as circuit implementations instantiated in CLBs or any functionality implemented in internal-only logic blocks of an FPGA, including but not limited to BRAM, DSP, and DCM, among other known FPGA internal logic blocks, that do not directly interface to circuitry external to the FPGA without going through at least one I/O block. I/O blocks 302-1 through 302-m may be thought of as circuitry that is functionality instantiated in IOBs.

Core clocks 1 through n can be respectively provided to core logic blocks 301-1 through 301-n. Optionally, core clocks 1 through n may be respectively provided to output buffers 304-1 through 304-n to provide reference clocks $C_1$ through $C_n$ externally from an FPGA. Furthermore, each I/O block 302-1 through 302-m may respectively receive an output clock signal 1 through output clock signal m. Responsive to output clock signals 1 through m, each I/O block 302-1 through 302-m may respectively provide an input clock signal 1 through m. Optionally, output clock signals 1 through m may respectively be provided to output buffers 305-1 through 305-m for providing reference clock output signals $O_1$ through $O_m$ externally from an FPGA.

Additionally, pass-through signals 1 through p may be respectively provided to pass-through output buffers 303-1 through 303-p for respectively providing reference clock signals 1 through p externally from an FPGA. Thus, it should be appreciated that reference clock signaling, such as reference clocks $C_1$ through $C_n$, $O_1$ through $O_m$, and 1 through p, may be associated with different types of circuitry internal to an FPGA, where signals illustratively shown on the left of portion 300 of FIG. 3 are generally FPGA internal signals and signals illustratively shown on the right of portion 300 of FIG. 3 are generally FPGA external signals.

FIG. 4 is block diagram depicting an exemplary embodiment of a core logic block 301, such as a core logic block of core logic blocks 301-1 through 301-n of FIG. 3. One or more inputs 405-1 through 405-N may be respectively provided to logic stages 401-1 through 401-N, where N is an integer greater than one. Output of each logic stage 401-1 through 401-N may be respectively provided as input to register stages 402-1 through 402-N. Output 406-1 of register stage 402-1 may be provided as an input to logic stage 401-2. Output 406-2 of register stage 402-2 may be provided as an input to a next logic stage after logic stage 401-2, and so on, such that an output 406-(N−1) is provided to logic stage 401-N.

Each register stage 402-1 through 402-N may be respectively provided with an enable signal 403-1 through 403-N. Notably, enable signals 403-1 through 403-N may be the same or different signals. Furthermore, one enable signal may be a delayed version of another enable signal for one or more of enable signals 403-1 through 403-N. It should be appreciated that each logic stage 401 or associated register stage 402 can be optional, as such logic or register stages may be bypassed as generally indicated by optional bypass connections 404 between outputs of logic stages 401 and associated register stages 402. Each register stage 402-1 through 402-N may be clocked responsive to a core clock signal 407. Notably, core clock signal 407 may be a core clock signal as described with reference to FIG. 3. Although rising-edge-triggered register stages are indicated, it should be appreciated that either falling-edge or rising-edge triggering may be done for register stages 402.

FIG. 5 is a block diagram depicting an exemplary embodiment of an I/O block 302. I/O block 302 may be an I/O block of I/O blocks 302-1 through 302-m of FIG. 3. Data signaling, which may be obtained from core logic blocks 301 of FIG. 3, may be provided to output registers 501-1 through 501-M of I/O block 302, which signaling is generally indicated as input signals 507-1 through 507-M, where M is an integer greater than one. One or more of output registers 501-1 through 501-M may optionally be bypassed to respectively provide bypassed output to one or more output buffers 503-1 through 503-M. Output of output registers 501-1 through 501-M is respectively coupled to provide input to output buffers 503-1 through 503-M. Enable signals, such as clock enable signals 505-1 through 505-M, may be respectively provided to output registers 501-1 through 501-M. Enable signals 505-1 through 505-M may be the same or different signals. An output clock signal 506 can be provided to output registers 501-1 through 501-M. Output clock signal 506 may be an output clock signal of output clock signals 1 through m as described with reference to FIG. 3.

On an input side of I/O block 302, input signaling 510-1 through 510-P may be respectively provided to input buffers 504-1 through 504-P, for P an integer greater than one. Output of input buffers 504-1 through 504-P may be respectively provided to input registers 502-1 through 502-P. Notably, one or more of input registers 502-1 through 502-P may optionally be bypassed such that output of one or more of input buffers 504-1 through 504-P is provided to core logic blocks 301-1 through 301-n as generally indicated by output signals 508-1 through 508-P provided thereto. Output of input registers 502-1 through 502-P may be provided as respective output signals 508-1 through 508-P to core logic blocks 301-1 through 301-n. Again, clock enable signals, though not illustratively shown, may be provided to input registers 502-1 through 502-P as generally input registers may be held in a clock enabled state, and input registers 502-1 through 502-P may be clocked responsive to input clock signal 509. Input clock signal 509 may be an input clock signal of input clock signals 1 through m as described with reference to FIG. 3.

With reference to FIGS. 3 through 5, it should be appreciated that jitter may be caused by Simultaneous Switching of Outputs (SSO) or Simultaneous Switching of Inputs (SSI), or any combination thereof. Additionally, core logic blocks, which may be provided by CLBs in an FPGA implementation, may cause jitter responsive to switching by one or more register stages in response to one or more core clock signals. Moreover, I/O blocks may cause jitter owing to switching by one or more output registers or one or more input registers, or any combination thereof, respectively responsive to one or more output clock signals or one or more input clock signals. Furthermore, pass-through signals in proximity to either or both one or more core logic blocks or one or more I/O blocks may have jitter coupled to such signals passing through output buffers, and thus themselves may have jitter when used to drive devices external to an IC, which in this particular example is an FPGA. Again with reference to FIG. 3, it should be appreciated that reference clock signals on the right of portion 300 are provided off-chip with respect to an IC die, and clock signals and pass-through signals, which may be clock signals in this example, on the left of portion 300 of FIG. 3 are internal IC die signals.

With respect to a design instantiated in programmable logic or an ASIC, or any combination thereof, it may be that power distribution system (PDS) response is a reasonably accurate predictor of jitter and, more particularly, directional shift. In other words, PDS response may be used to predict left and/or right shift in clock signals when viewing such PDS response with respect to system elements. Thus, for example, PDS response of a PCB, a die and package in combination, and decoupling capacitors associated therewith, as illustratively shown in FIG. 2, may be used for predicting directional shift. Furthermore, if a backplane is added to this configuration, PDS response of such backplane and any associated decoupling capacitance may be included in predicting directional shift.

The phrase "directional shift," as used herein, can refer to an amount by which an edge of a clock signal is shifted in a particular direction. Directional shift can refer to a left shift and/or a right shift with respect to an edge, whether a rising or a falling edge, of a clock signal. Accordingly, a directional shift in a clock signal can be observed with respect to the period of the clock signal, the low pulse of the clock signal, and/or the high pulse of the clock signal.

The amount of logic, as well as the frequency of switching of such logic, may be factors in predicting directional shift. PDS response may change for changes in reference clock frequency versus core clock frequency or for changes in I/O clock frequency versus reference clock frequency. Accordingly, by changing clock frequencies of one or more of these clocks, different levels of directional shift may result. Thus, modeling may be used where frequency of one or more of these clock frequencies is changed in order to provide noise management with respect to jitter. Other factors which may affect jitter, and thus directional shift, include temperature and supply of voltage, which may be thought of as scaling factors with respect to directional shift. Furthermore, the amount of ground bounce, as well as semiconductor process variation, may affect directional shift.

Figure 6:
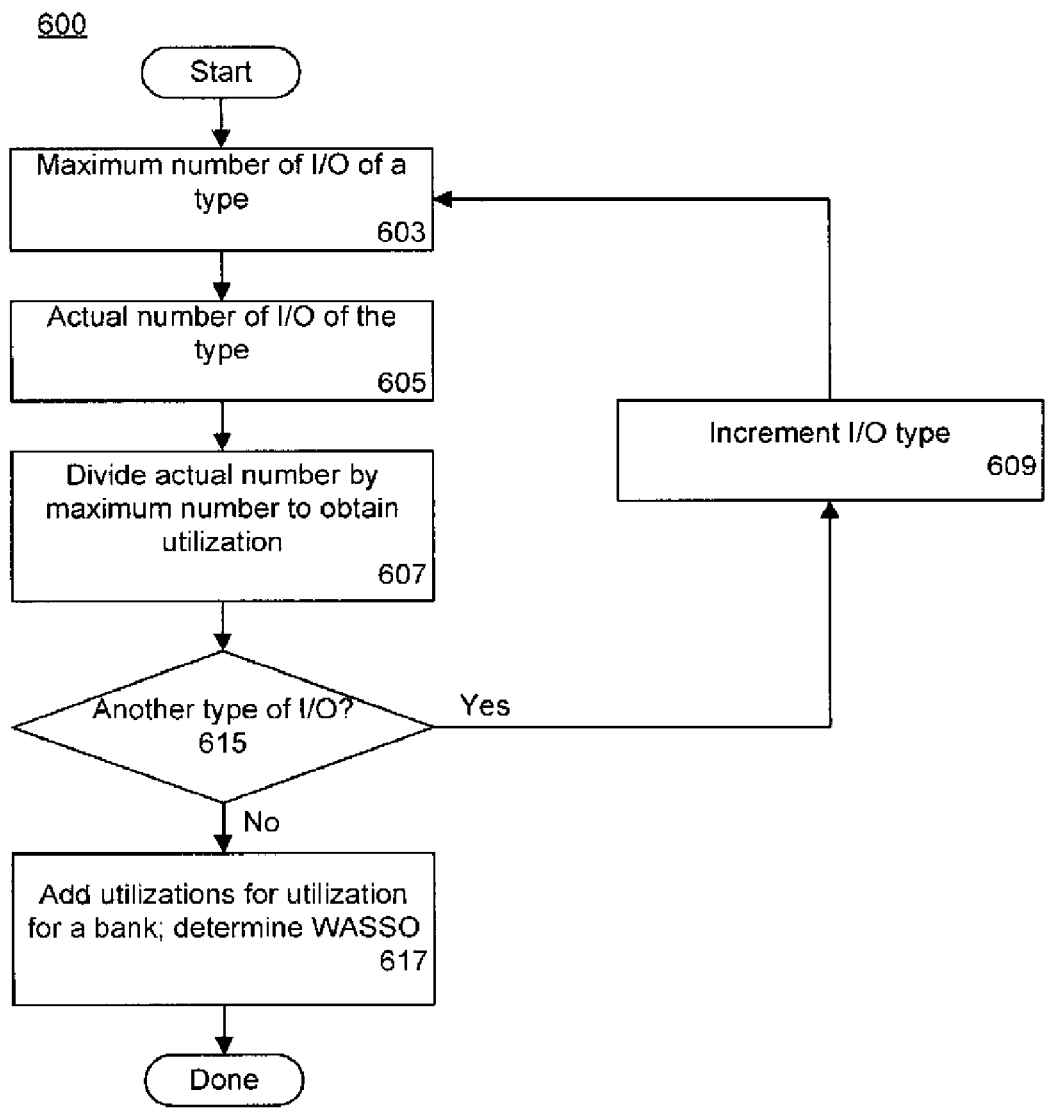
FIG. 6 is a flow chart depicting an exemplary method of determining a Weighted Average Simultaneous Switching of Outputs (WASSO).

FIG. 6 is a flow chart depicting an exemplary method 600 of determining a Weighted Average Simultaneous Switching of Outputs (WASSO). The method 600 can be implemented by, for example, a software-based circuit design tool, e.g., an electronic design automation (EDA) tool, a computer aided design (CAD) tool, or the like. In another example, the method can be implemented by a WASSO analysis module disposed within such a design tool.

In any case, the method 600 is for one bank of a plurality of banks of an IC, and thus may be repeated for each bank of an IC to obtain an I/O utilization for each bank of pins of an IC. However, within a grouping or block of I/Os of a bank, there may be different types of interfaces, such as HSTL and SSTL, among others, implemented. In step 601, a maximum number for a type of I/O can be initialized. An actual number of the I/O type used can be determined in step 605 for a proposed implementation. In step 607, the actual number determined in step 605 can be divided by the maximum number from step 603 to provide a utilization for that I/O type. It should be appreciated that utilization of an I/O type may be used to provide a WASSO for a bank.

If in step 615 it is determined that another type of I/O of the bank is to be processed, in step 609 the I/O type can be incremented. Steps 603 through 607 can be repeated for another I/O type. The method can repeat in this manner until all types of I/Os have been processed as determined in step 615. If no more I/Os for a bank are to be processed as determined in step 615, the utilizations for each I/O type as determined in step 607 can be added in step 617. The total utilization determined in step 617 may be used as a WASSO value for a bank.

Determining a WASSO for I/Os of a bank to be used allows a circuit designer to evaluate ground bounce performance of a bank by homogenizing the various loads driven by the I/Os of bank. For purposes of clarity, WASSO has been described with reference to FIG. 6. However, a weighted average SSI (WASSI) may equally apply with respect to use of I/Os of a bank used for input of information to an IC die. Thus, WASSO calculation flow 600 may include WASSI with respect to determining utilization of I/O devices of a bank, and whether I/O simultaneous switching exceeds a threshold amount of simultaneous switching.

Figure 7:
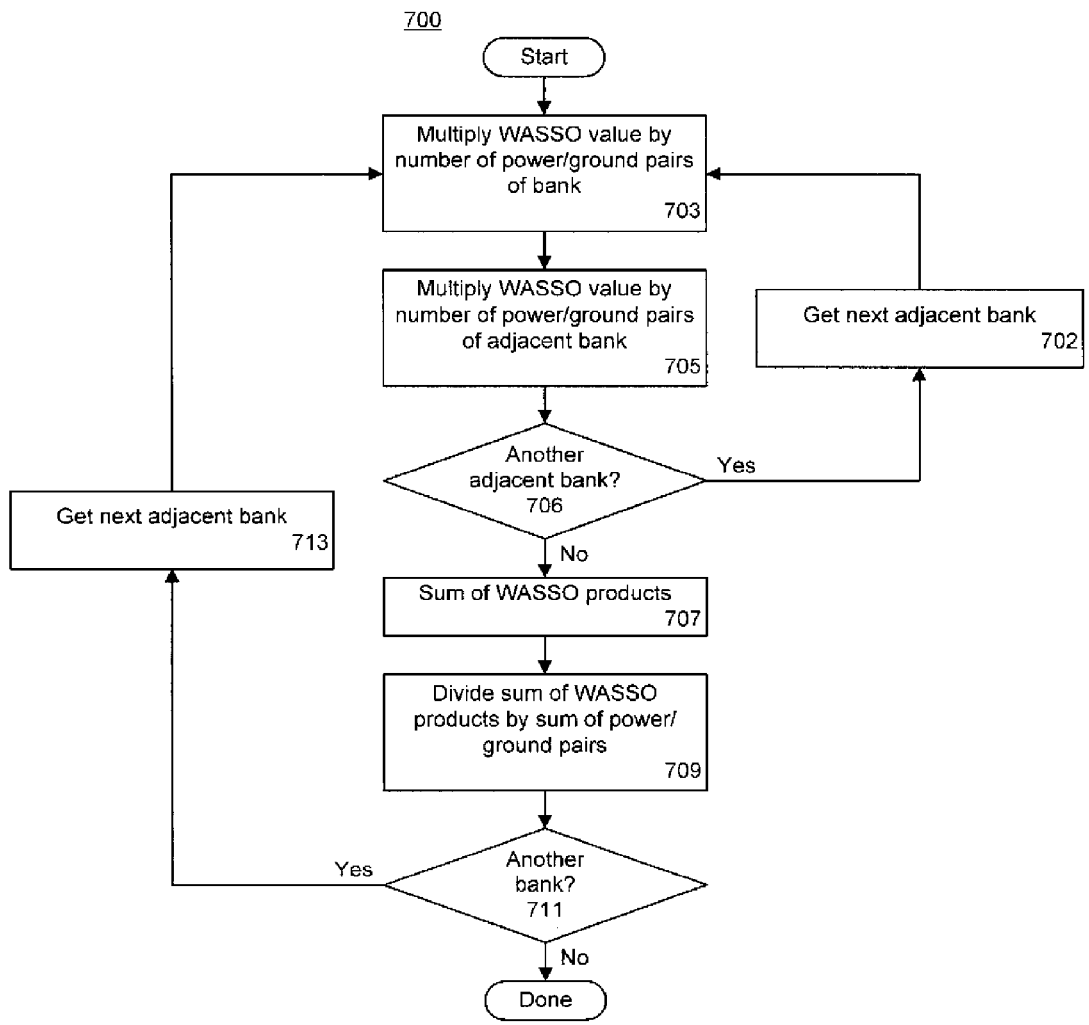
FIG. 7 is a flow chart depicting an exemplary method of determining a 2-Bank WASSO utilization flow.

FIG. 7 is a flow chart depicting an exemplary method 700 of determining a 2-Bank WASSO utilization. Method 700 can be implemented within a design tool, as discussed, e.g., by a WASSO analysis module. The method 700 can be used in evaluating ground bounce voltage for adjacent banks. By adjacent banks, it is meant horizontally or vertically adjacent along an edge of the banks of an IC die. The method 700 can begin in a state where an initial bank may be set; the initial bank having I/O, or at least output drivers, as associated with SSO.

In step 703, a previously determined WASSO value for the bank, as described above, can be obtained and multiplied by the number of power/ground pairs of the bank. In step 705, the WASSO value used in step 703 may be multiplied by the number of power/ground pairs of an adjacent bank to the initial bank, where the adjacent bank has I/O devices as associated with SSO. In step 706, it may be determined whether there is another adjacent bank to the initial bank obtained in step 703. If there is another adjacent bank having I/O devices associated with SSO as determined in step 706, the next adjacent bank can be obtained in step 702. Accordingly, the WASSO value used in step 703 can be multiplied by the number of power/ground pairs in the next adjacent bank in step 705. This loop may repeat until each adjacent bank to the initial bank is processed. Once no other adjacent bank is to be processed, as determined in step 706, in step 707 WASSO products of the bank and of adjacent banks thereto as determined in steps 703 and 705, respectively, can be summed. In step 709, the sum obtained in step 707 can be divided by the sum of all power/ground pairs in each of the adjacent banks obtained. The result of step 709 is a 2-Bank WASSO value.

In step 711, it may be determined whether another 2-Bank WASSO value is to be determined for another bank. If another bank is to be processed as determined in step 711, in step 713, the bank may be incremented and the method may proceed again starting at step 703, but for the other bank. Accordingly, method 700 may be repeated for each bank, and once it is determined that there are no other banks to process as determined in step 711, method may end.

Figure 8:
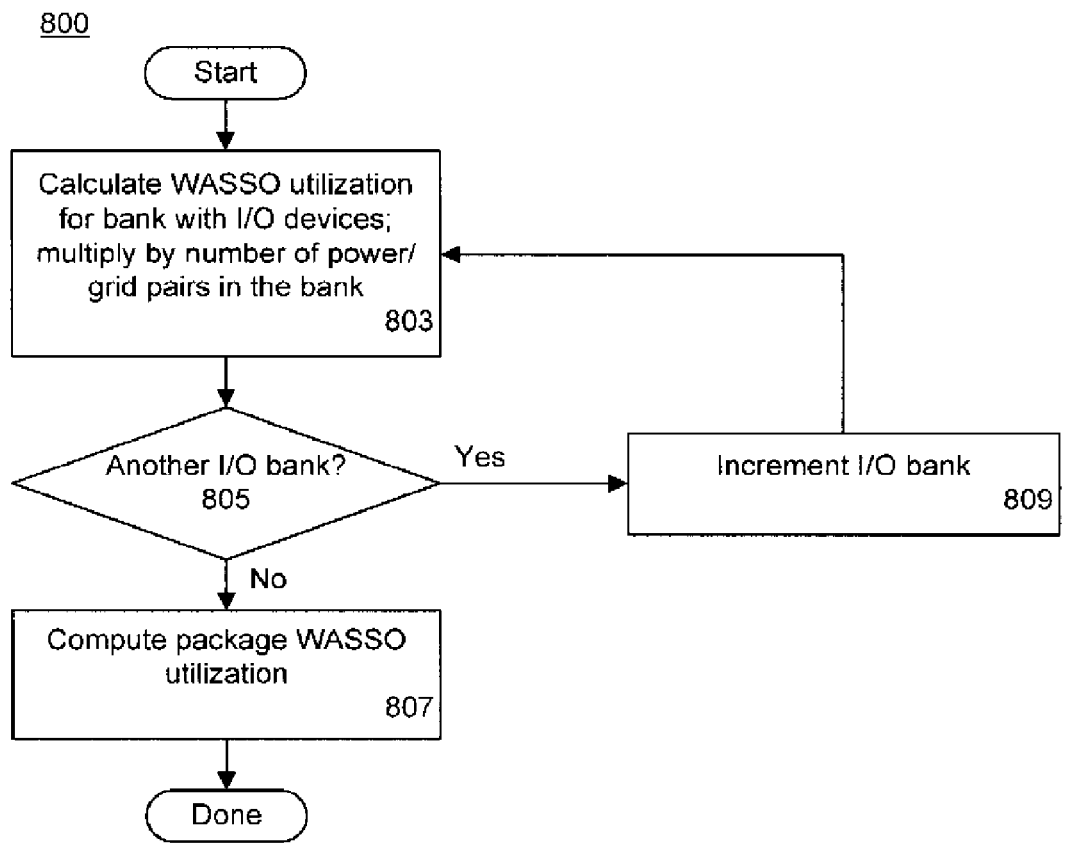
FIG. 8 is a flow chart depicting an exemplary method of determining a package WASSO utilization.

FIG. 8 is a flow diagram depicting an exemplary method 800 of determining a package WASSO utilization. Method 800 can be implemented by a design tool as described. Method 800 can begin in a state where an initial bank having I/O devices associated with SSO is obtained.

Accordingly, in step 803, WASSO utilization for the initial bank may be calculated. This WASSO utilization may be calculated as described with reference to FIG. 7. The WASSO utilization may be multiplied by the number of power/ground pairs in the initial bank as part of step 803. In step 805, it may be determined whether there is another bank to process. If there is another bank to process, in step 809 the bank can be incremented and a next or incremented bank can be processed in step 803.

Once all banks have had a WASSO utilization calculated therefor, a package WASSO utilization may be computed in step 807. Package WASSO utilization may be determined by taking the sum of each WASSO utilization multiplied by the power/ground pairs of a bank, namely the sum of all results of 803, and dividing that sum by the total number of power/ground pairs for each of the banks processed using package WASSO utilization flow 800. This determination of package WASSO utilization is illustratively shown in Equation 1:

$$\frac{\sum [(WASSO\ UTIL.)(NO.PWR/GRD\ PAIRS)]}{\sum (NO.PWR/GRD\ PAIRS)} \quad (1)$$

Additional details regarding WASSO may be found in U.S. Pat. No. 7,139,691 entitled "Method for Calculating Weighted Average Ground Bounce Noise Generated By Simultaneous Switching Outputs in a Digital System," which is incorporated herein by reference in its entirety.

Figure 9:
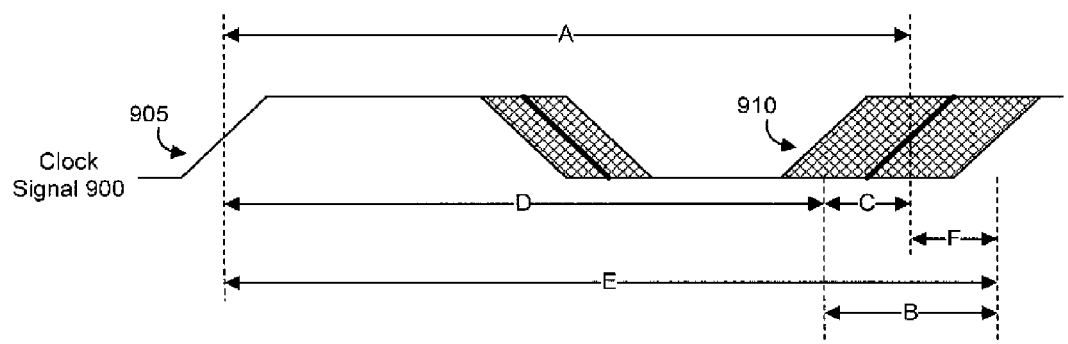
FIG. 9 is a first signal diagram illustrating aspects of jitter that can be predicted in accordance with an embodiment of the present invention.

FIG. 9 is a signal diagram illustrating the effects of different types of jitter that can be predicted in accordance with another embodiment of the present invention. FIG. 9 illustrates a clock signal 900 having a nominal period of A. Two pulses 905 and 910 of the clock signal 900 are shown. When jitter affects the clock signal 900, period A may be shortened or lengthened as a consequence of the jitter. In FIG. 9, jitter and the range of jitter on the signal 900 is illustrated with cross-hatching for both the falling and rising edges. In this example, jitter can be observed in the shortening or lengthening of period A of the clock signal 900. In general, shortening the nominal period A occurs where pulse 910 shifts left. Lengthening the nominal period A occurs when pulse 910 shifts right. This shortening or lengthening occurs within the jitter band B.

Conventionally, jitter is discussed with reference to a jitter band, e.g., jitter band B. A review of the nominal period A of the clock signal 900 indicates that the jitter band B may be characterized in terms of a left shift of the next pulse, e.g., pulse 910, and a right shift of pulse 910 with respect the nominal period A. The effects of the left shift from on clock signal 900 can be observed in period D, which generally is the nominal period A of clock signal 900 minus the amount of left shift C. The effects of right shift on clock signal 900 can be observed in period E, which generally is the nominal period A plus the amount of right shift F.

Though left and right shift are described with respect to FIG. 9 in terms of period, it should be appreciated that left and right shift can be observed and quantified for rising edges of a pulse as well as for the falling edge of a pulse. As noted, this allows left and right shift to be calculated to determine the high pulse and low pulse portions of a clock signal of an IC.

Figure 10:
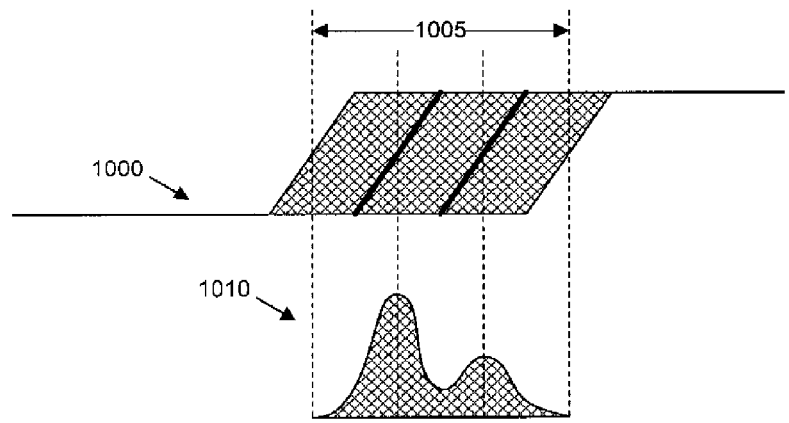
FIG. 10 is a second signal diagram illustrating aspects of jitter that can be predicted in accordance with another embodiment of the present invention.

FIG. 10 is a signal diagram illustrating aspects of jitter that can be predicted in accordance with another embodiment of the present invention. FIG. 10 illustrates a jitter band 1005 occurring around the rising edge of a clock signal 1000. Below clock signal 1000 is a histogram 1010 illustrating the effects of jitter on the rising edge of clock signal 1000. As shown, histogram 1010 does not take the form of a Gaussian distribution. The peak of histogram 1010 is not centered within the jitter band 1005. Further, as is often the case, the jitter is complex in nature, manifesting itself in terms of a bimodal curve in this case. In other cases, jitter may be observed as a trimodal curve or some other complex waveform. As such, one cannot simply divide the jitter band in half to determine an accurate estimate of left shift or right shift.

Figure 11:
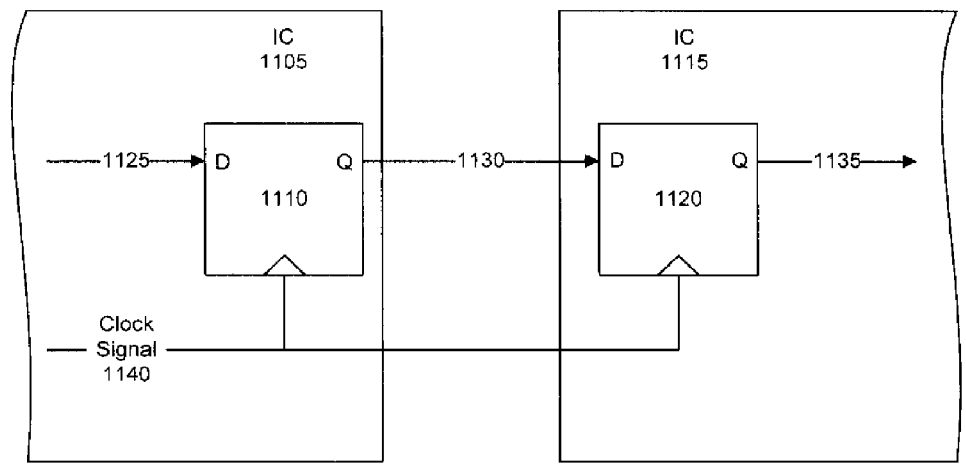
FIG. 11 is a block diagram depicting an exemplary embodiment of a register-to-register transfer between ICs.

FIG. 11 is a block diagram illustrating an exemplary embodiment of a register-to-register transfer between ICs. As shown, IC 1105 can include a register 1110. IC 1115 can include register 1120. Register 1110, within IC 1105, can receive signal 1125. The output of register 1110, e.g., signal 1130, can be provided, or linked, to the input of register 1120 in IC 1115. Register 1120 can provide an output signal 1135. Both IC 1105 and IC 1115 can be driven by a common clock signal 1140.

Figure 12:
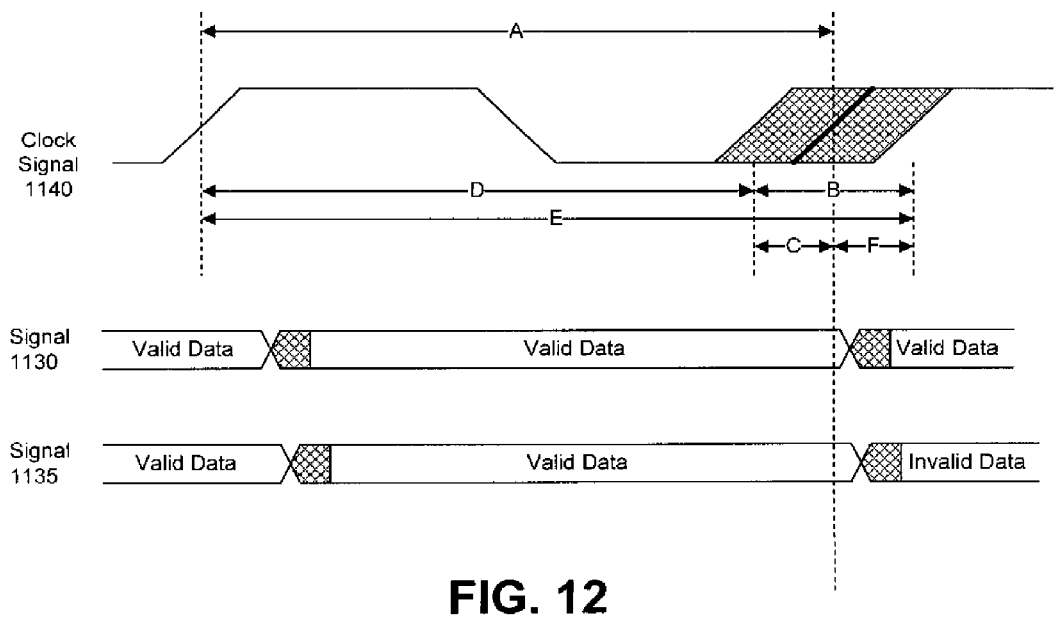
FIG. 12 is a timing diagram illustrating effects of left and right shift upon the circuit of FIG. 11.

FIG. 12 is a timing diagram illustrating the effects jitter in terms of left and right shift upon the circuit of FIG. 11. As shown, the nominal period of clock signal 1140 is depicted as period A. The jitter band is indicated by B. The shortened period of clock signal 1140, in consequence of left shift C, is labeled D. The extended period of clock signal 1140, in consequence of right shift F, is labeled as E. In general, the left shift C of clock signal 1140 will affect setup time of registers. The right shift F of clock signal 1140 will influence the hold time for register-to-register transfers. A deviation in either one of the left shift C or the right shift F may result in invalid data within the circuit as shown with respect to signals 1130 and 1135.

In accordance with another embodiment of the present invention, the design tool can include, or have access to, a plurality of data sets. Each data set can correspond to a particular type of directional shift. For example, one type of directional shift can refer to change in period of a clock signal of an IC. Another type of directional shift can refer to the high pulse. Yet another type of directional shift can refer to low pulse. Within each type of directional shift, left or right shift further can be specified. As such, within each data set, a data subset corresponding to left shift and another data subset corresponding to right shift can be included.

Each data set can be generated by observing behavior of an IC. The IC can be loaded with a circuit design that attempts to utilize as much of the IC as is possible in terms of logic blocks and other circuit resources. With resource utilization tending toward the upper limits, the directional shift observed will approximate a "worst case" scenario. A particular reference clock frequency can be set. Another clock can be adjusted through a frequency range while observing each type of directional shift for both left and right upon the reference clock. The process can be repeated for different reference clocks. The data can be accumulated and stored within the respective data sets and subsets as described with reference to clock period, low pulse, and high pulse. This data can be referenced by the design tool to predict and/or plan for directional shift, for example, as explained with reference to FIGS. 13 and 14 herein. These values can be scaled lower according to actual and/or estimated resource usage as will be described herein in greater detail.

In another embodiment, the data can be generated using a circuit design with minimal resource usage and, thus, approximate a "best case" scenario in terms of directional shift. In that case, values obtained from the data can be scaled upward according to actual and/or estimated resource usage. For example, directional shift characteristics for one CLB and/or one SSO driver may be determined. The directional shift characteristics for one CLB and/or one SSO driver may be used to scale the directional shift from the data set upward according to actual and/or estimated resource usage.

In general, the data reflects the individual contribution of one clock onto another. Accordingly, when determining the effect of one clock onto a plurality of different clocks, the effect of clock A, for example, onto clock B can be determined. Another lookup operation can be performed to determine the effect of clock A onto clock C. Directional shift data can be determined by indexing into the appropriate data set according to operational frequency of each clock. When determining the effect of a plurality of clocks onto a single clock, separate lookup operations must be performed for each of the plurality of clocks with respect to the single clock. The effects then can be summed to determine the combined effect of the plurality of clocks onto the single clock. In this manner, the influence of clocks upon one another can be broken down into multiple components, where each component reflects the influence of one clock onto a second clock, e.g., a clock pair. The components from clock pairs can be combined to provide an indication of the effect of a selected clock onto a plurality of other clocks or the effect of a plurality of clocks onto a selected clock.

Figure 13:
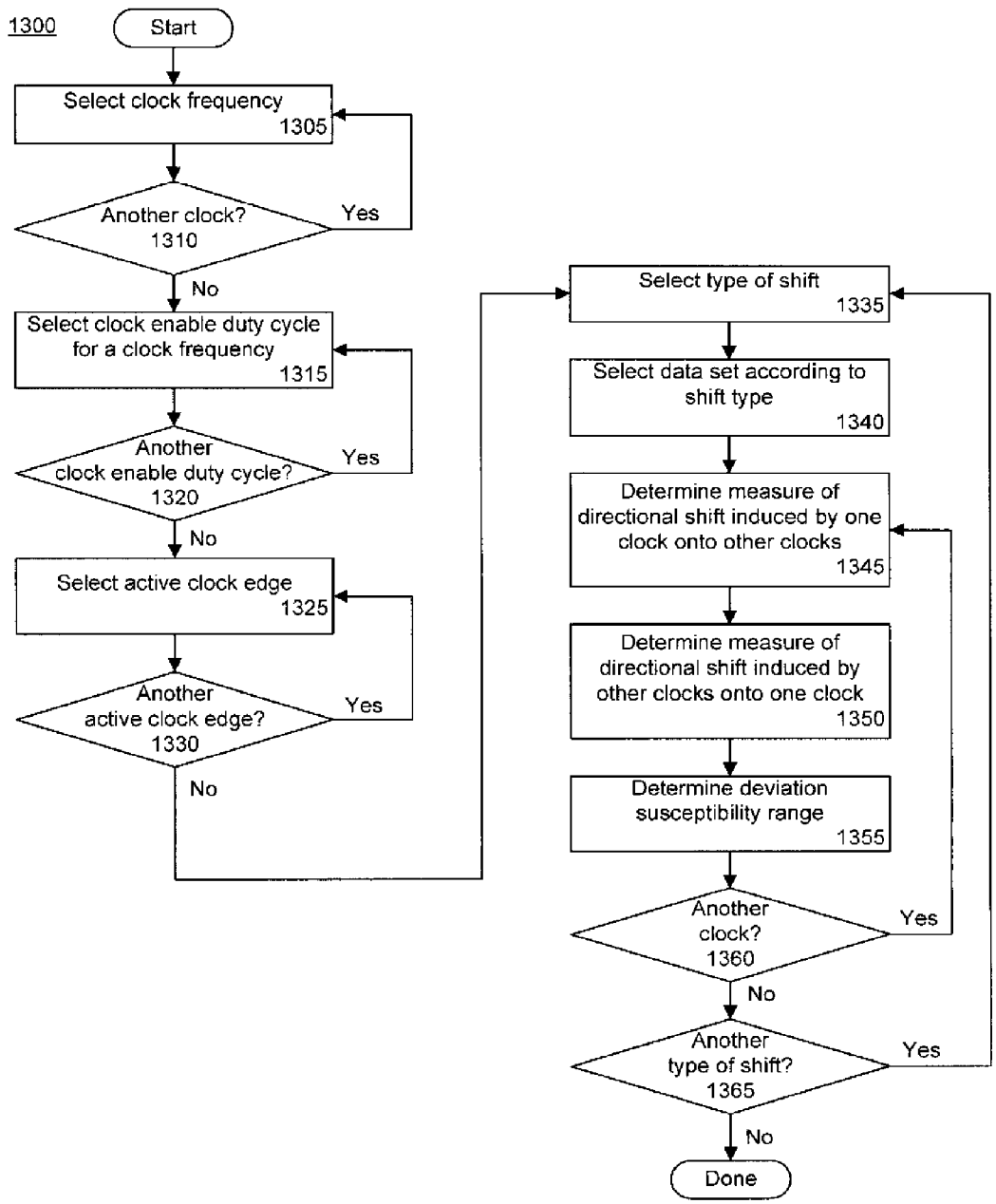
FIG. 13 is a flow chart illustrating a method of planning for directional shift of a clock signal in accordance with another embodiment of the present invention.

FIG. 13 is a flow chart illustrating a method 1300 of planning for directional shift of a clock signal in accordance with another embodiment of the present invention. Method 1300 can be implemented within a software-based circuit design tool as described. For example, method 1300 can be implemented by a planning module included within such a design tool. Method 1300 can predict influence of different clocks within a target IC for planning purposes, e.g., prior to actual specification of a circuit design.

Method 1300 of FIG. 13 illustrates a technique for predicting the influence of clocks upon one another with respect to directional shift. The method can be performed, for example, in cases where circuit configuration data is sparsely available. For instance, estimates of directional shift can be provided using the parameters discussed without the need for more specific details relating to CLB usage, I/O usage, or the like. Further, method 1300 can reveal a qualitative level of directional shift due to interaction among multiple clock domains so that frequencies may be selected in such a way as to minimize directional shift.

In step 1305, a clock frequency of operation can be selected. In step 1310, a determination can be made as to whether there is another clock signal (clock) to be selected. If there is another clock signal to be selected, a frequency for such other clock signal can be selected in step 1305. The method 1300 can iterate until a frequency is selected for each clock signal to be implemented. After all clock signal frequencies have been selected, the method can continue to step 1315.

In step 1315, a clock enable duty cycle for an operating clock signal can be selected. In step 1320, a determination can be made as to whether another clock enable duty cycle is to be selected. If another clock enable duty cycle is to be selected, the method can return to step 1315. This loop can repeat for each clock signal selected above. Once all clock enable duty cycles for each operating clock signal have been selected, the method can continue to step 1325.

In step 1325, the active clock edge for an operating clock signal can be selected. The active clock edge indicates, for example, rising, falling, or both. In step 1330, a determination can be made as to whether another active clock edge for another clock is to be selected. If so, the method can loop back to step 1325 and continue looping until such time that no further active clock edges remain to be selected. After step 1330, the method can continue to step 1335.

In step 1335, a user selection of a type of directional shift can be received. Different types of directional shift, as noted, can include clock pulse shift (in reference to clock period), high pulse shift, or low pulse shift. The type of shift further can specify whether a right or left shift analysis, or both, is desired.

In step 1340, a data set can be automatically selected for use in computing the selected type of shift based upon the type of shift determined in step 1325. Further, the particular data subsets in terms of left and/or right shift also can be selected.

In step 1345, a measure of directional shift induced by one clock, e.g., a selected clock, onto other clocks can be determined. As noted, this can be determined clock pair component by clock pair component. In step 1350, a measure of directional shift induced by each other clock of the circuit design onto the selected clock can be determined on a pair-wise basis.

In step 1355, a deviation susceptibility range can be determined. The deviation susceptibility range can indicate different frequency ranges for each of the clocks of the circuit that will have the most effect, least effect, no effect, etc., upon other clocks of the circuit design.

In step 1360, a determination can be made as to whether there is another clock signal to be processed, e.g., another clock signal to be selected. If so, the method can loop back to step 1345 to determine directional shift induced by the selected clock onto other clocks, the directional shift of other clocks onto the selected clock, and the deviation susceptibility range. If there are no further clocks to be processed, the method can continue to step 1365.

In step 1365, a determination can be made as to whether another type of shift is to be processed. If so, the method can loop back to step 1335 to process the further type of directional shift. If not, the method can end.

It should be appreciated that factors such as the clock enable duty cycle; the active clock edge, WASSO, as well as other parameters described herein may be applied as scaling factors. The scaling factors can be applied to individual components, e.g., to the result of each clock pair lookup result, to the final output that may be the combination of a plurality of clock pair components, or to both. The scaling factors may be used to scale data upward or downward, depending upon whether the data approximates a best or worst case scenario as described. It further should be appreciated that factors such as clock enable duty cycle and the active clock edge may influence the operational frequency of clocks used to index into the data set to determine a directional shift component for a given clock pair.

Figure 14:
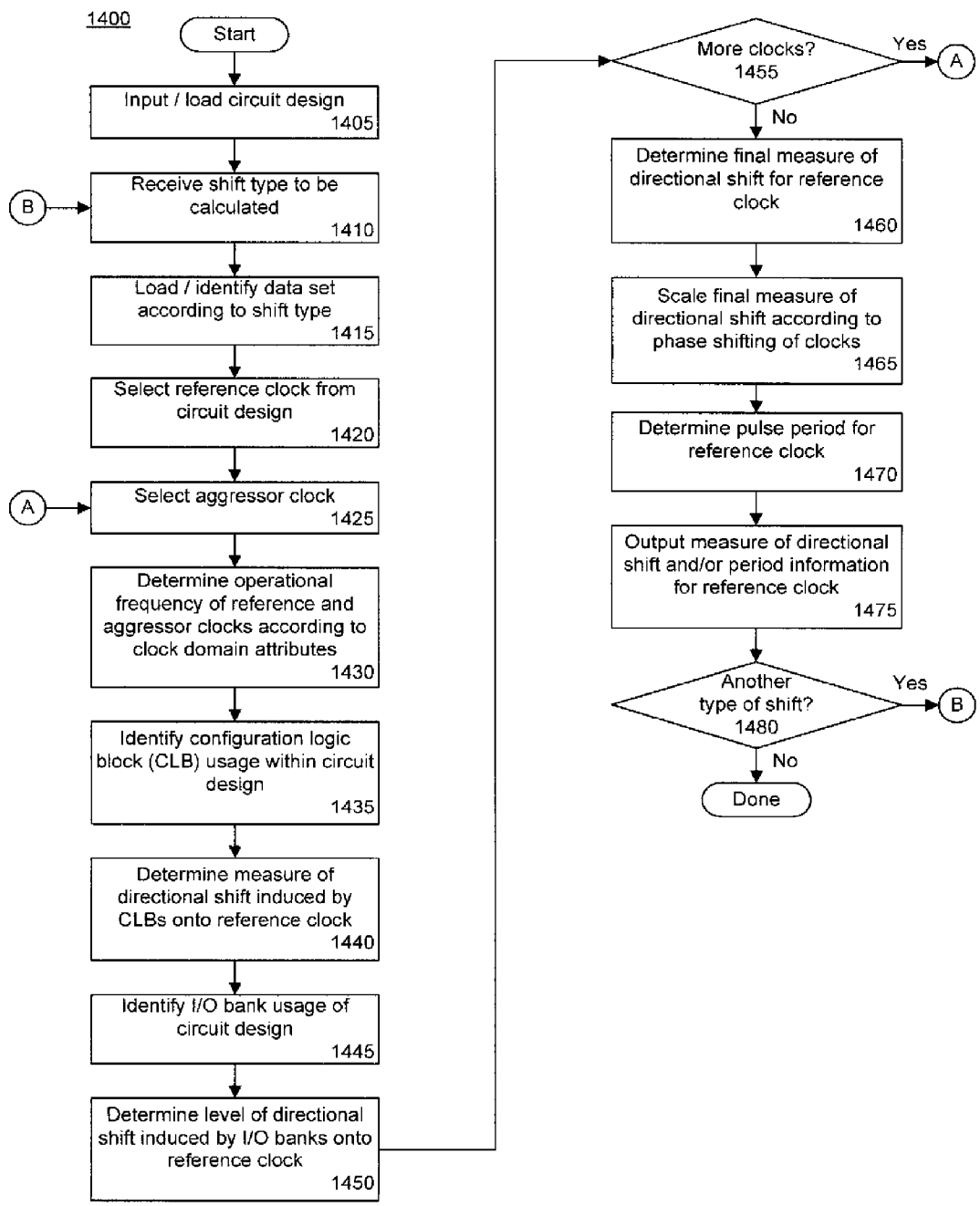
FIG. 14 is a flow chart illustrating a method of predicting directional shift of a clock signal in accordance with another embodiment of the present invention.

FIG. 14 is a flow diagram illustrating a method 1400 of predicting directional shift of clock edges for a circuit design to be implemented within an IC in accordance with another embodiment of the present invention. The method of FIG. 14 can be implemented within a circuit design tool, as discussed. For example, method 1400 can be implemented by a directional shift prediction module.

The method 1400 can begin in step 1405, where a circuit design can be input and/or loaded into the design tool. As known, the circuit design can specify various parameters and configuration information for the circuit design. Such information can include, for example, descriptions of the various logic block configurations utilized within the circuit design, descriptions of I/O bank configurations utilized within the circuit design, or the like.

Examples of logic blocks of an FPGA can include CLBs, DSPs, BRAMs, embedded processors, among other known logic blocks. Logic block configuration information can specify parameters such as one or more of minimum and maximum clock frequencies, clock enable duty cycle, active clock edge rising or falling, number of flip-flops, clock pulse/high pulse/low pulse (hereafter C/HP/LP) deviation reduction scaling factor, or C/HP/LP deviation reduction quality of implementation, among other details described herein.

I/O bank configuration information can include, for example, one or more of minimum and maximum clock frequencies, clock enable duty cycle, the type of flip-flop of the last output stage (such as "D" flip-flop or DDR flip-flop, among other known types of flip-flops), driver output type and slew rate, input receiver type and slew rate, output undershoot and overshoot, input undershoot and overshoot, output phase drift, output ground bounce limit, or output voltage tolerance, among other types of descriptor details described elsewhere herein.

In step 1410, a type of shift to be predicted can be received by the design tool. As noted, different types of directional shift exist and can be calculated. For example, the input can specify whether a measure of right shift or left shift is to be calculated for clock period, low pulse, or high pulse. In step 1415, a particular data set and/or data subset can be selected according to the specified type of directional shift determined in step 1410.

Accordingly, in step 1420, a reference clock, or clock signal, can be selected from the circuit design loaded in step 1405. In step 1425, an aggressor clock can be selected from the circuit design. The aggressor clock can be another clock or clock domain within the circuit design to be implemented within an IC. As noted, each clock will likely have an effect upon itself and each other clock with respect to directional shift. It should be appreciated that, in general, the level of contribution by a clock onto itself is typically much less than by other clocks. Nevertheless, the self component can be included for more accuracy and completeness. In this case, the effects of the aggressor clock can be determined in terms of inducing directional shift upon the reference clock.

In step 1430, the operational frequency of the reference clock and the aggressor clock can be determined according to attributes of the clock domain specified within the circuit design. Various attributes of a clock domain can influence the operational frequency of the clock. For example, if circuit elements are clocked on both rising and falling edges of the clock, the clock has an operational frequency of approximately two times the stated frequency. By the same token, if the duty cycle of the clock is at 50%, the operational frequency of the clock will be one-half of the stated frequency.

In step 1435, the usage of CLBs within the circuit design can be determined. More particularly, the number of CLBs that are part of each clock domain within the circuit design being evaluated can be determined. The usage can be expressed in terms of a percentage, for example, of total CLBs within the IC. For instance, if a given IC includes, for purposes of discussion, 10,000 CLBs, and 1,000 CLBs are clocked by the reference clock, CLB usage with respect to the reference clock can be expressed as 10%, or 0.1. CLB usage for each clock domain within the circuit design can be calculated.

In step 1440, a measure of directional shift of the selected type induced by the CLBs driven by other clocks onto the reference clock can be determined. In determining the measure of directional shift, a value can be looked-up, or selected, from the data set corresponding to the selected directional shift type. The measure of directional shift can be determined by indexing into the appropriate data set and/or data subset using the operational frequency of the reference clock and the operational frequency of the aggressor clock.

The measure of directional shift obtained from the lookup operation reflects a worst case measure of directional shift. As noted, values for the data sets can be collected with CLB usage of the IC at or near maximum levels to the extent possible. As CLB usage of each clock effects the amount of directional shift induced onto each other clock, the measure of directional shift determined can be scaled according to CLB usage. In one embodiment, the measure of directional shift can be scaled according to CLB usage on the reference clock. Taking the previous example, if CLB usage was 10% on the reference clock, the measure of directional shift can be multiplied by a factor of 0.1. In another embodiment, the measure of directional shift can be scaled, or further scaled as the case may be, according to CLB usage with respect to the aggressor clock.

As noted, in the case where the data reflects a best case measure of directional shift, any values determined may be scaled upward, rather than downward, according to CLB usage as the case may be.

In step 1445, the usage of I/O banks within the circuit design can be determined. The number of I/O banks that are part of each respective clock domain of the circuit design being evaluated can be determined. The usage can be expressed in terms of a percentage, for example, of total I/O banks within the IC as was the case with respect to CLB usage.

In step 1450, the level of directional shift induced by I/O banks onto the reference clock can be determined. As noted with respect to CLBs, the operating frequency of the reference clock and the aggressor clock can be used to index into an appropriate data set and/or data subset corresponding to directional shift for an IC. The data set used may be the same data set described with reference to CLB usage, for example. In any case, the measure of directional shift induced by I/O banks can be determined. This measure can be scaled according to I/O bank usage for the reference clock, the aggressor clock, or both.

Again, in the case where the data reflects a best case measure of directional shift, any values determined may be scaled upward, rather than downward, according to I/O bank usage as the case may be.

In step 1455, a determination can be made as to whether further aggressor clocks exist within the circuit design. If so, the method can loop back to step 1425 to select another aggressor clock and continue processing. The method 1400 can continue to iterate, for example, until the effect of each clock of the circuit design is considered with respect to the reference clock. If no further clocks remain, the method can proceed to step 1470.

In step 1460, a final measure of directional shift for the reference clock can be determined. In one embodiment, each measure of directional shift determined with respect to the various aggressor clocks onto the reference clock can be summed. The measures can be combined using any of a variety of known summation techniques, e.g., weighted sums, straight addition, sum of squares, or the like.

In step 1465, the final measure of directional shift can be further scaled according to phase shifting on the clocks. In cases where the database does not account for phase shift on the clocks, the result obtained from using normal data, e.g., data not accounting for phase shift, can be scaled according to characterization data. The result can be scaled using a set of coefficients. Accordingly, the amount of directional shift that results from phase shifting may be determined using the characterization data for a device that is made available by the manufacturer based, at least in part, upon the directional phase shift mode and setting. Alternatively, the amount of directional shift may be determined through other means such as calculations, graphs, and the like.

In step 1470, a pulse period for the reference clock can be determined. For example, in the case of left shift, the final measure of directional shift can be subtracted from the nominal period of the primary clock signal to yield the minimum period of the reference clock. In the case of right shift, a maximum period of the reference clock can be determined. The final measure of right shift can be added to the nominal period of the reference clock to determine the maximum period of the reference clock.

In step 1475, the measures of directional shift, e.g., the final measure of directional shift, can be output. As used herein, "outputting" and/or "output" can mean, for example, writing to a file, writing to a user display or other output device, playing audible notifications, sending or transmitting to another system, exporting, or the like. Further, if so configured, the development tool can output period information such as the minimum period of the reference clock, the maximum period of the reference clock, both, a difference between the two, and/or the sum of the two.

In step 1480, a determination can be made as to whether another type of directional shift is to be determined. If so, the method can loop back to step 1410 to receive a further user input indicating the type of shift to be calculated. If not, the method can end. It should be appreciated that the various component values, the final result(s), or both that are discussed with reference to FIG. 14 can be scaled as described with reference to FIG. 13, e.g., using WASSO or other factors.

As noted, the individual measures of left and right shift provide increased accuracy with respect to noise estimation within an IC. The left and right measures of shift, for the most part, are not equivalent. Rather than adding or subtracting the entire jitter band to determine a minimum or maximum clock period, separate measures of left and right shift increase jitter prediction accuracy. Moreover, as noted, the measures of left and right shift are more accurate than the case where the entire jitter band is simply divided by two in an attempt to approximate left or right shift.

The method 1400 has been described with reference to a particular reference clock. The effects of clocks in the circuit design upon another clock can be calculated by repeating method 1400 where a different clock is selected as the reference clock. By selecting a different clock as the reference clock and repeating the steps of FIG. 1400, the effects of jitter induced by each clock onto each other clock can be calculated.

Figures 2, 15A:
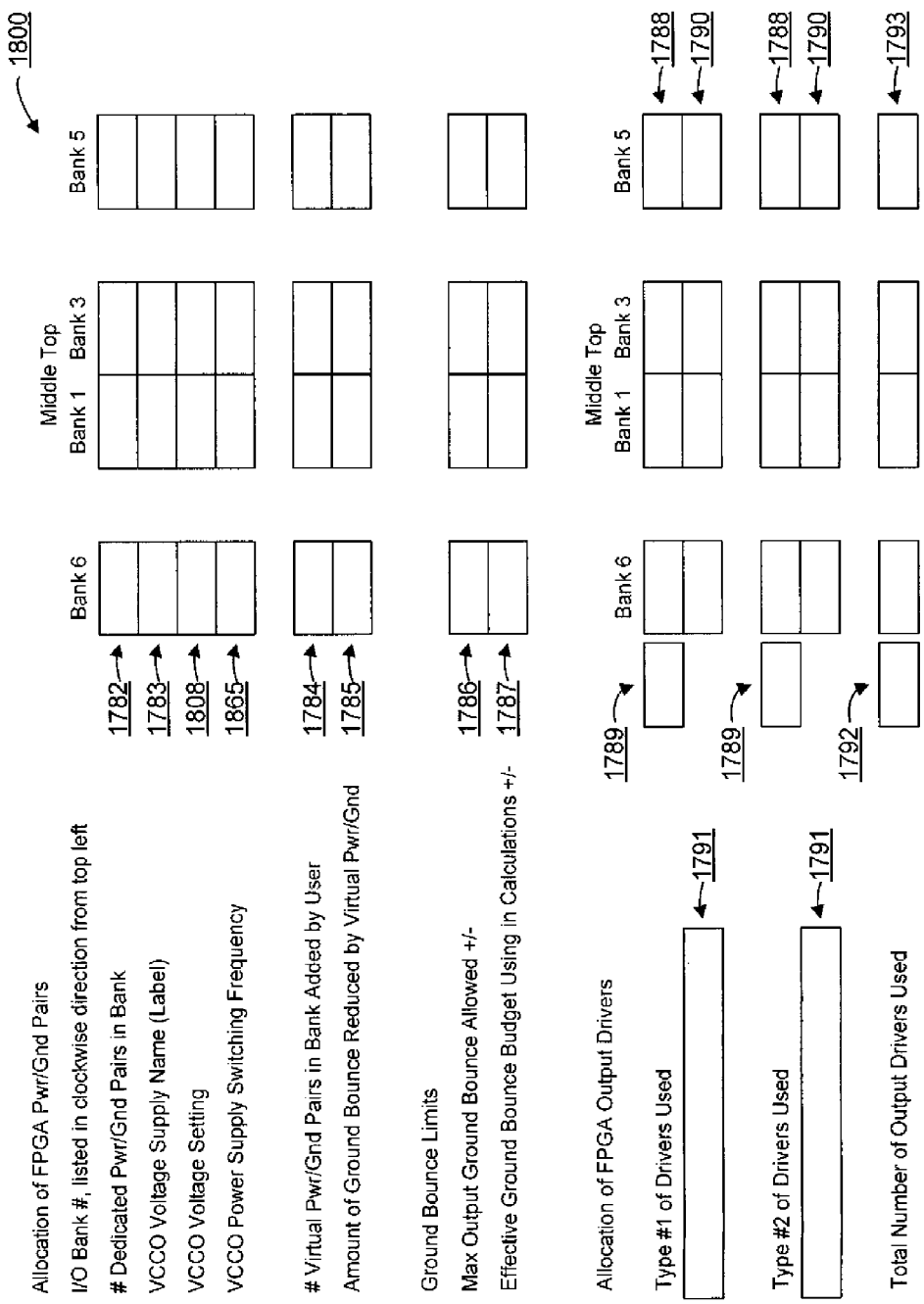
Figures 4, 15A:
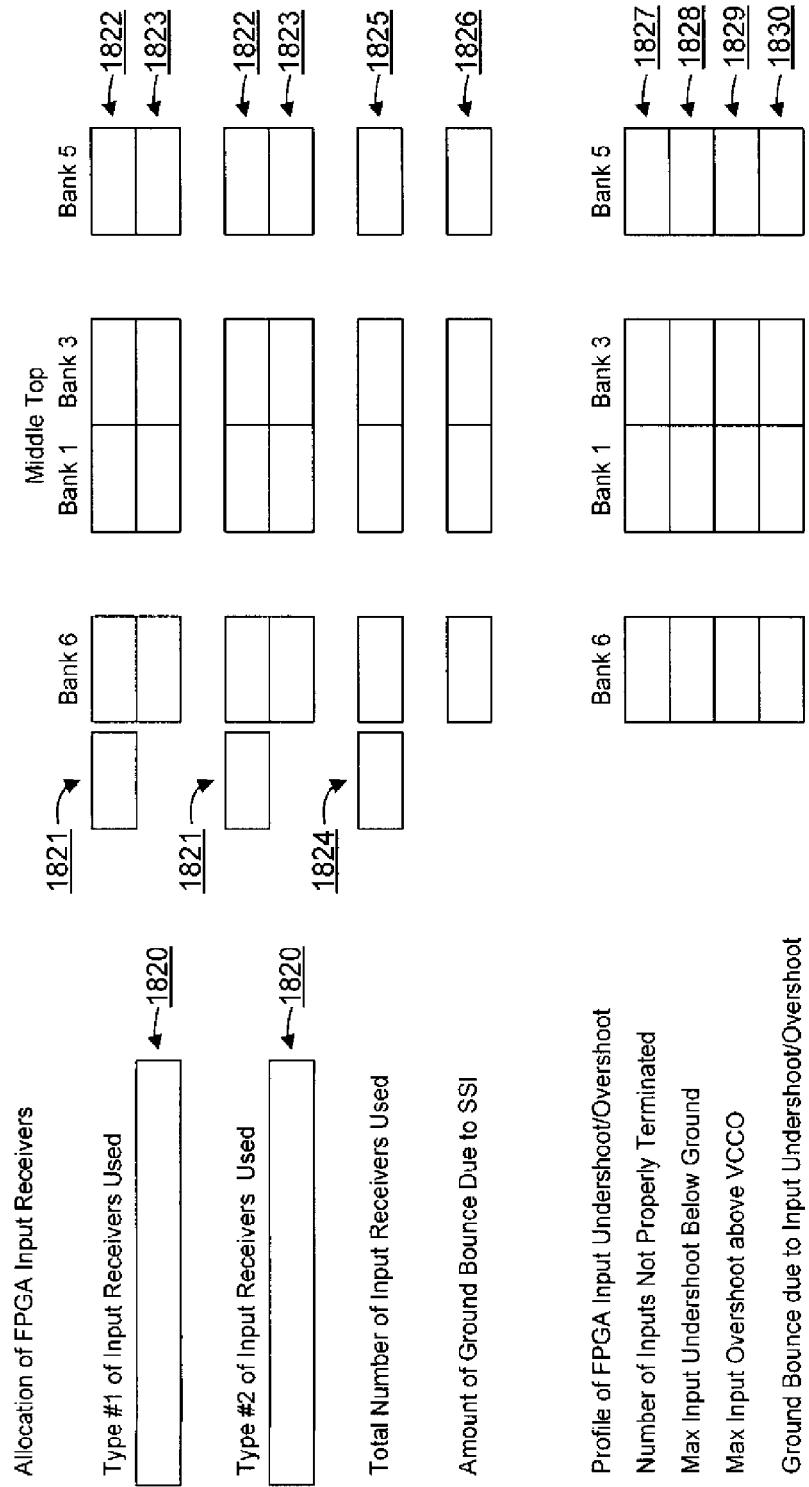
Figures 5, 15A:
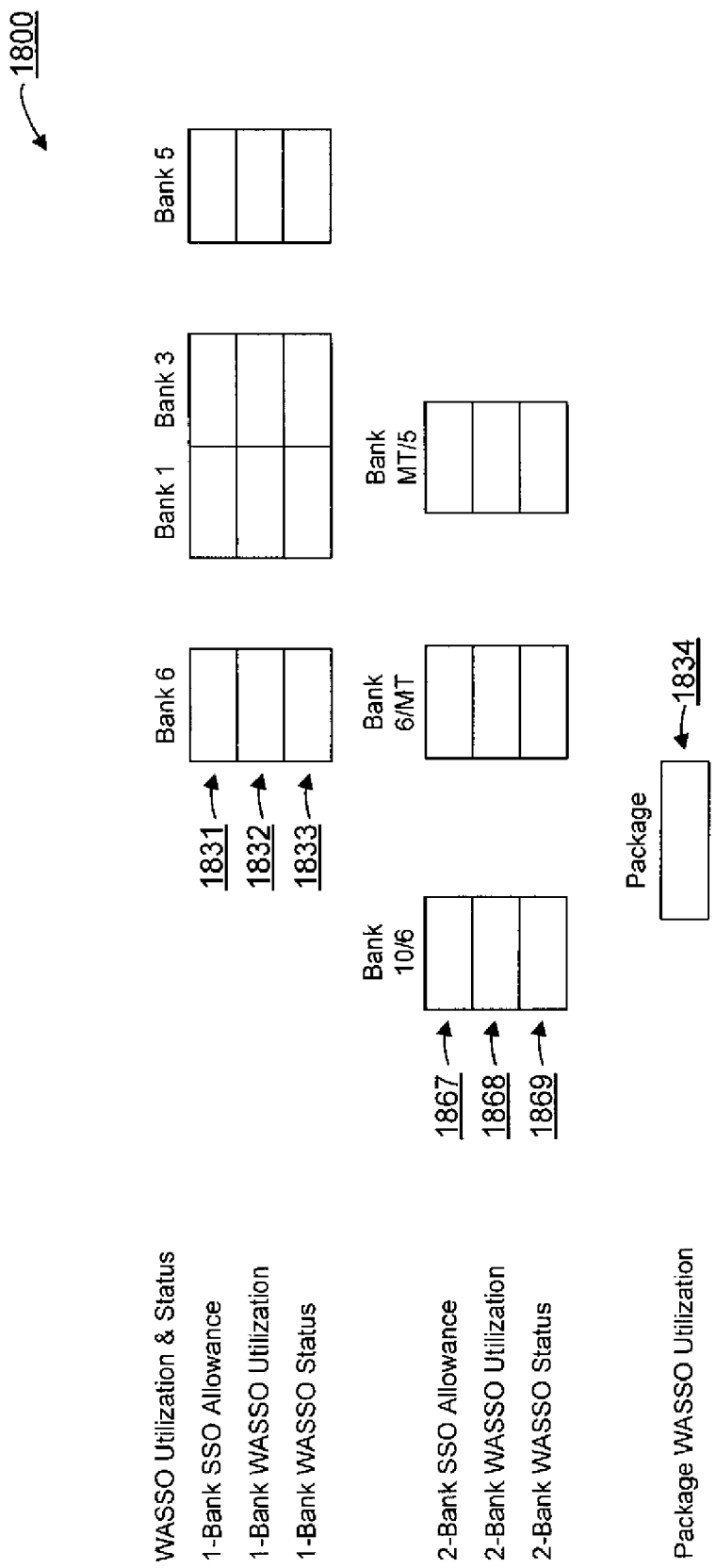
Figures 2, 15B:
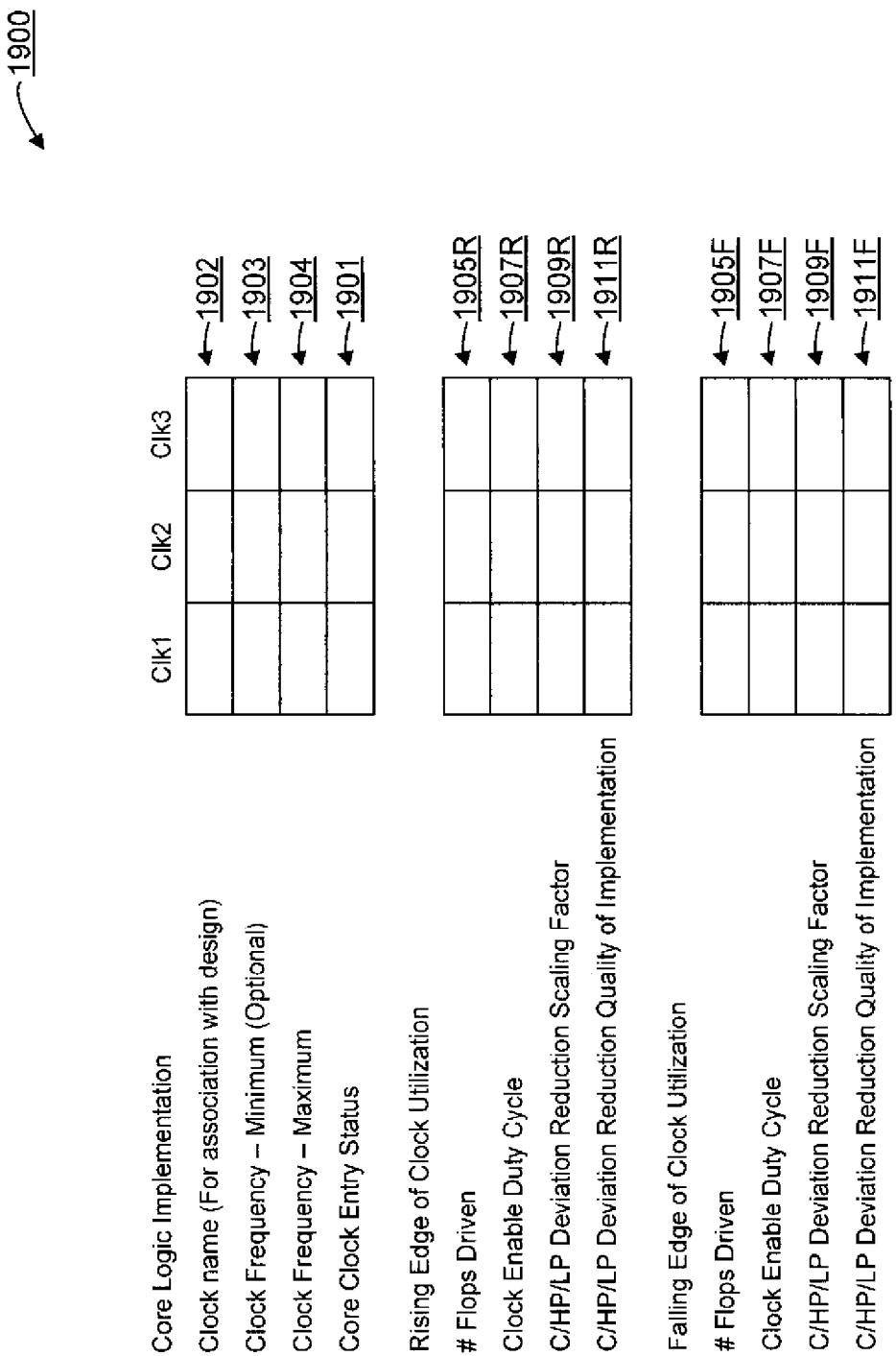
Figures 3, 15B:
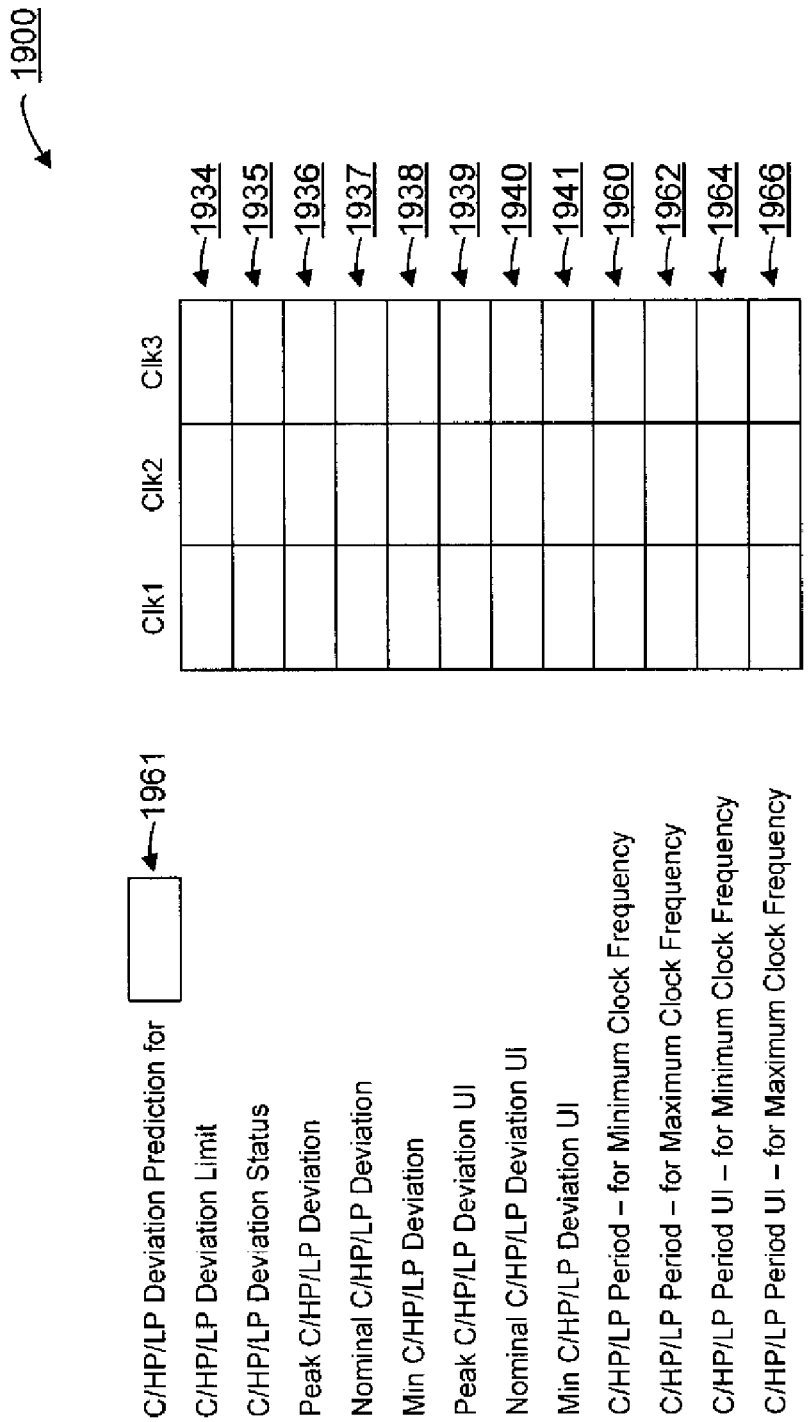
Figures 6, 15B:
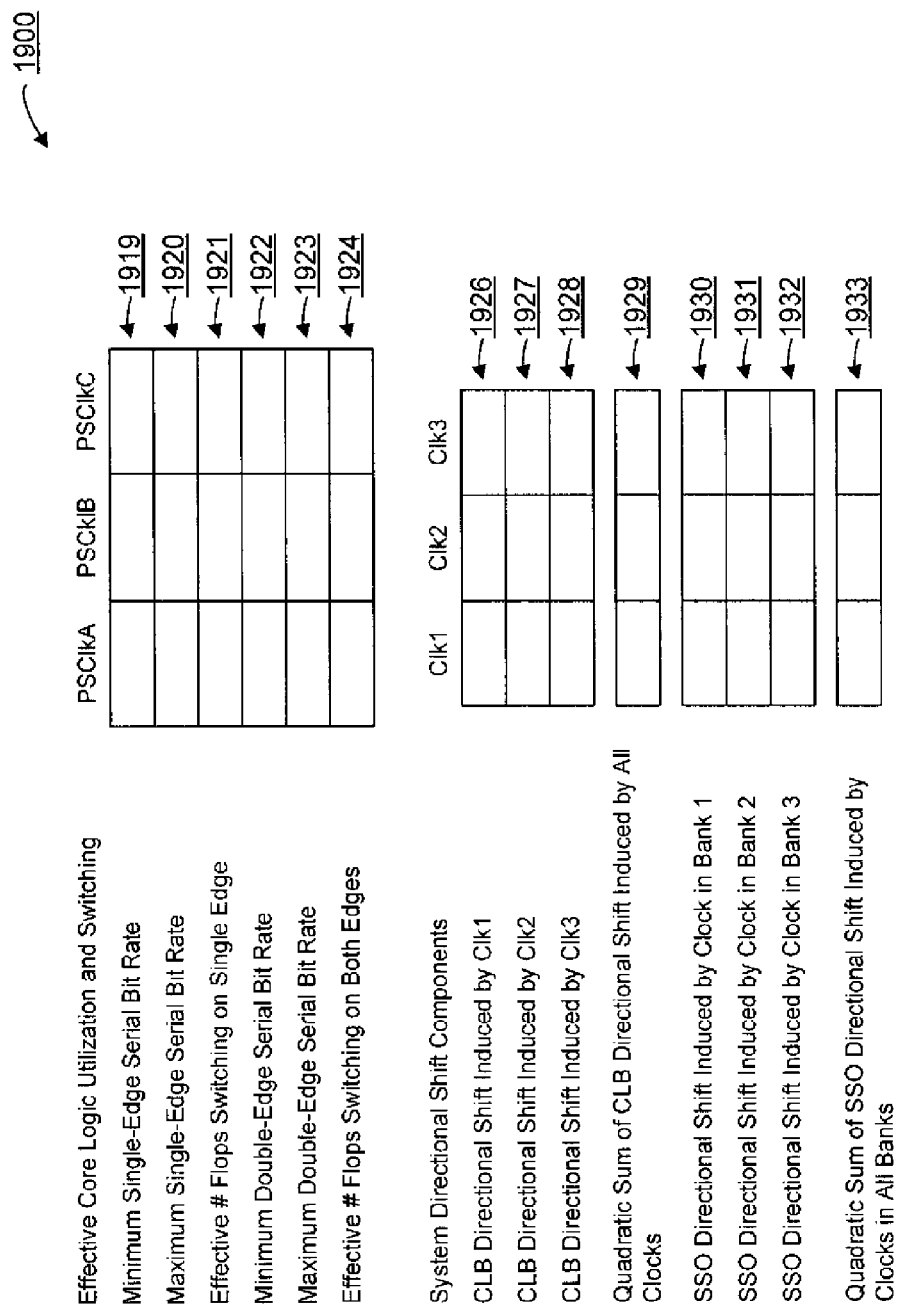

FIGS. 15A-15B, taken collectively, illustrate a user interface for an analysis tool in accordance with another embodiment of the present invention. While the analysis tool can be included as a module or component of a larger analysis tool or suite, e.g., an EDA tool, in another embodiment the analysis tool can be implemented as a spread sheet having a plurality of data input fields. In any case, the user interface described with reference to FIGS. 15A-15B is presented as an exemplary interface and is not intended to limit the embodiments disclosed herein. Those skilled in the art will appreciate that other types of user interfaces, graphical controls, and/or user feedback mechanisms may be used.

FIGS. 15A-1 through 15A-5 collectively refer to a spread sheet diagram depicting an exemplary user interface 1800 that can be used with a WASSO analysis module. A device family, which in this example is an FPGA family, may be specified in field 1801. Notably, once this device is specified by a user, it may be propagated in other locations of a user interface. This is also true with respect to a user specifying a device number in field 1802, a package type in field 1803, a speed grade in field 1804, and an operating temperature in field 1805. Notably, IC configuration information as may be obtained from a manufacture of such a part may be used as described herein. Speed grade input in field 1804 may be used to account for slight variation in ground bounce due to speed grade, such as a result of semiconductor process variation for example, based on manufacturer's characterization data. Alternatively or in addition to speed grade, slight variations in semiconductor processing may be determined through other means such as curves, graphs, or calculations.

Operating temperature and voltage for each of supply voltage level (rail) may be used to account for slight variation in ground bounce based on manufacturer's characterization data. Differences in temperature may be accounted for in scaling factor percent variation or mV of ground bounce per degree Celsius (C). Differences in supply voltages may be accounted for in scaling factor percent variation or mV of ground bounce per mV of supply voltage variation. Moreover, differences caused by variation of temperature or supply voltage may be as determined by manufacturer's characterization data or through other means such as curves, graphs, or calculations.

Voltage parameters which may be entered by a user include Vcc internal supply name, voltage setting, and power supply switching (ripple) frequency for entry in fields 1861, 1806, and 1862, respectively. Other voltage parameters that may be entered by a user include Vcc auxiliary supply name, voltage setting, and power supply switching frequency for entry in fields 1863, 1807, and 1864, respectively. WASSO analysis portion 1800 may include an analysis mode field 1713. As described above, the What-If mode allows a user to do I/O pinout assignment before committing to a hardware implementation of a design. Implementation details may be extracted from a PCB routing database and an Integrated Software Environment (ISE) database respectively associated with, for example, a PCB router and/or FPGA design and router tool, and SSO calculations may be performed based on the values of the implementation details extracted.

As is known, a PCB may have dedicated power and ground via geometries. Continuing the example of an FPGA, such geometries are described in section 1781. Power/ground break-out via diameters for a finished via may be input by a user in field 1730. Power/ground pad to break-out via trace length may be input by a user in field 1731. Break-out trace width may be input by a user in field 1732. The examples of user inputs described with respect to section 1781 may all have been input based on design parameters created by a circuit designer or loaded in from a PCB database such as may be provided by a PCB manufacturer. However, other PCB parasitic inductances and socket inductance, as may be input in fields 1733 and 1734 respectively, are design parameters which a user would enter but which would not be obtainable from such a PCB database. From at least above described input to fields 1730 through 1732, via inductance may be calculated and populated in field 1735; break-out inductance may be calculated and populated in field 1736; mutual inductance may be calculated and populated in field 1738; and total inductance may be calculated and populated in field 1739. Notably, for this example, mutual inductance for field 1738 is for a Sparse Chevron package.

Grover's formulas and tables for calculating inductance may be used. Calculation for via inductance in field 1735 may be done according to:

$$L = 5.08 \times (\text{Board Thickness}) \times \left( \text{Ln}\left( \frac{4 \times (\text{Board Thickness})}{(\text{Via Diameter})} \right) - 0.75 \right) \quad (2)$$

Calculation for break-out via inductance in field 1736 may be done according to:

$$L = 5.08 \times (Brkout \text{ Thickness}) \times \left( \text{Ln}\left( \frac{4 \times (Brkout \text{ Length})}{(Brkout \text{ Width})} \right) - 0.75 \right) \quad (3)$$

Calculation for mutual inductance in field 1738 may be done according to:

$$L = 5.08 \times (\text{Board Thickness}) \times \\ \text{Ln}\left( \frac{\begin{array}{c}(\text{Distance from Signal Pin to Ground Pin}) \\ (\text{Distance from Ground Pin to } VCCO \text{ Pin}) \\ (\text{Distance from Signal Pin to } VCCO \text{ Pin})\end{array}}{(\text{Radius of Ground Pin})} \right) \quad (4)$$

Total via inductance in field 1739 may be done by calculating the sum of the results populated in fields 1735 through 1737 minus the result populated in field 1738.

As is known, an FPGA has banks of pins. The number of banks may vary from FPGA to FPGA. Allocation of FPGA power/ground pairs is described below with reference to four exemplary banks, namely banks 1, 3, 5, and 6; other banks may be included but are excluded here for purposes of clarity as they would just be repetitive. Additionally, it should be appreciated that a middle top is specified for the combination of banks 1 and 3. A middle bottom of two other banks may be used. Notably, I/O bank number in this example is listed in a clockwise direction from the top left of an FPGA.

The number of dedicated power and ground pairs in a bank may be displayed in fields 1782, and these values may be obtained based on the FPGA family and device specified as well as the package type. Use device family, part number, and package number may be obtained from an ISE database, such as associated with FPGA design and router tool, to automatically look up the number of dedicated power/ground pairs per bank for fields 1782.

VCCO supply name label, voltage setting, and power supply switching frequency may be provided by a user in fields 1783, 1808, and 1865, respectively. Examples of names of supply voltage levels for fields 1783 may be 5V, 3V, 8V or other known supply voltage designation. This facilitates associating a bank with a power supply plane in the PCB stack-up, which may be used to determine the buried capacitance of such plane. Additionally, this association may be used to determine interaction with a discrete capacitor network mounted on a PCB for determining an overall PDS response.

The number of virtual power and ground pairs in a bank added by a user may be specified by a user in fields 1784 for each affected bank. The amount of ground bounce reduced by a virtual power/ground pair may be calculated and populated in fields 1785 for each affected bank. Fields 1785 report the amount of ground bounce reduced by virtual power/ground pins that are implemented by tying I/O pins directly to either ground or VCCO on a PCB. These pins may be configured as strong/fast output drivers by an FPGA configuration bitstream. The amount may be determined from manufacturer's characterization data or through other means such as calculations, graphs, and the like.

Ground bounce limits may be specified as well as calculated. For example, a maximum output ground bounce allowed may be specified by a user in fields 1786 for each bank. The effective ground bounce budget used in calculations may be determined and populated in fields 1787. Notably, the allocation of FPGA power and ground pairs is used to determine 1-Bank WASSO Utilization.

Allocation of FPGA output drivers may be specified by a user or loaded from an ISE database such as may be available from an FPGA vendor for example and associated with FPGA design and router tool. There may be a number of output driver standards supported and any or some subset of such output drivers standards supported may be used. In this particular example, two types of output drivers are specified though fewer or more than two types of output drivers may be specified by either a user or loaded in from an ISE database. The number of drivers in each bank that are used may be indicated in fields 1788, and the total number of a type of driver for all banks may be specified in fields 1789. The type of output drivers used in a bank may be chosen depending on the type of interface input by a user or obtained from an ISE database as indicated in fields 1791; the number of those drivers allowed per power/ground pair is indicated in fields 1790. The total number of output drivers may be calculated for all banks as well as for each bank and placed in fields 1792 and 1793 respectively. Content of each field 1790 may be obtained by looking up an SSO number associated with the output standard type selected. Otherwise, a user may enter an SSO number directly into each field 1790.

Profile of FPGA output undershoots/overshoots is described in the next section of WASSO analysis portion 1800. Again, the example banks 1, 3, 5, and 6 as described above are used, though other banks may be used. The number of outputs not properly terminated for each affected bank may be a user design parameter specified in fields 1794, and the maximum output undershoot below ground may be specified by a user in fields 1795 for each affected bank. The maximum output overshoot above VCCO may be specified in fields 1796 for each affected bank. The amount of ground bounce due to output undershoot/overshoot is calculated and populated in fields 1797 for each affected bank. Notably, a visual indicator flag may be used if a number is excessive. The amounts populated in fields 1797 may be determined by manufacturer's characterization data based on parameters in fields 1794 through 1796. Alternatively, the amount of ground bounce induced by output undershoot/overshoot may be determined through other means such as curves, graphs, calculations, and the like.

A profile of FPGA output phase shifting may be input by a user for calculating the amount of ground bounce reduced by phase shifting. Accordingly, a user may input a number of output bits phase shifted in fields 1798 for each affected bank and may input the amount of phase shift relative to an output clock edge in fields 1799 for each affected bank. The amount of ground bounce reduced by phase shifting may be used to populate fields 1809 for each affected bank. The amounts shown in fields 1809 may be determined by manufacturer's characterization data based at least in part on the amount of phase shift and the output standard type. Alternatively, the amount of ground bounce reduced by phase shifting may be determined through other means such as calculations, graphs, and the like.

A profile of FPGA output capacitive loading may be determined next. The number of loads per driver may be entered for each bank by a user in fields 1810 for each affected bank. In fields 1811, capacitance per load for each affected bank may be entered by a user. Generally a user will use the largest value for populating fields 1810 and 1811. A user may enter a Manhattan distance to a nearest load and a Manhattan distance to a farthest load in fields 1812 and 1813 respectively. A user may specify a name of a primary clock used in each bank in fields 1870. A minimum primary output clock frequency may optionally be specified by a user and placed in field 1814 for each affected bank. A maximum primary output clock frequency may be specified by a user or may be obtained from an ISE database and loaded into fields 1815 for each affected bank. A user may specify an output clock enable duty cycle in fields 1816 for each affected bank, and may specify whether a single or double data rate is used in fields 1817 for each affected bank. The type of flip-flop, such as a delay (D), DDR, or other known type of flip-flop, used for a last output stage may be input by a user or loaded from an ISE database to populate fields 1866. Load capacitance per output driver may be calculated and populated in fields 1818 for each affected bank. An effective capacitance derating factor may be calculated for each affected bank and placed in fields 1819.

The parameters shown in the fields for the above-described profile of FPGA output capacitive loading are used to determine the effect of capacitive loading on ground bounce on an mV/pF basis, as determined from the manufacturer's characterization data. Capacitive loading may be determined from manufacturer's characterization data, which results in a different derating amount that reflects the operating condition as determined by the parameters in allocation of FPGA input receivers fields described below. This derating factor can also be determined through other means such as calculations, graphs, and the like. As part of determining the derating factor for capacitive loading, an output clock enable duty cycle of field 1816 accounts for whether the output switches at full clock speed or at sub-harmonic thereof. If a DDR register is used as may be indicated in field 1817, the clock frequency may be multiplied by two to account for the effective data rate. In addition, distance to the load(s), output clock frequency, and total load capacitance per driver may be taken into account to closely approximate the effect of loads on ground bounce.

Allocation of FPGA input receivers may be specified. Notably, there may be some number of input receiver standards supported. The type of input receivers used may be specified by a user or obtained from an ISE database and loaded in fields 1820 for each affected bank. The total number of each type of such receiver may be determined and placed in fields 1821. The number of each type of receiver, or input driver, as specified by a user or as obtained from an ISE database may be populated for each affected bank in fields 1822, and the number of each type of receiver used as calculated may be specified in fields 1823. Accordingly, although only one type of input receiver is shown in this example, it should be appreciated that fewer or more than one type may be implemented. The total number of input receivers used for all banks may be specified in field 1824 and the number of input receivers used for each affected bank may be specified in fields 1825.

In addition to summing up the number of input receivers used for fields 1824 and 1825, the amount of ground bounce due to SSI may be calculated for each affected bank and populated in fields 1826. The number of inputs and the input standard type may be used to determine the amount of ground bounce induced. The scaling factor for mV of ground bounce for each operating scenario may be determined by manufacturer's data or through other means such as curves, graphs, calculations, and the like. Alternatively, the effect of SSI may be calculated based on the number of SSI allowed per power/ground pair.

Above the profile of FPGA output undershoot/overshoot was described. Now the profile of FPGA input undershoot/overshoot is described. A user may specify the number of inputs not properly terminated for each bank in fields 1827. In fields 1828, a user may specify the maximum input undershoot below ground for each bank. The maximum input overshoot above VCCO may be specified for each bank in fields 1829. Consequently, the amount of ground bounce due to input undershoot/overshoot may be determined for each bank and placed in fields 1830.

Field 1830 shows the amount of ground bounce induced by input undershoot/overshoot. The number of pins with undershoot/overshoot, the voltage level and duration of undershoot/overshoot, and the input standard type may be used to determine the amount of ground bounce. The scaling factor for mV of ground bounce for each operating scenario may be determined by manufacturer's characterization data or through other means such as calculations, graphs, calculations, and the like.

WASSO utilization and status is described next. Notably, an example of 1-Bank and 2-Bank WASSO utilization and status is described; however, fewer than 1-Bank or more than 2-Bank WASSO utilization and status may be implemented from the description herein. SSO Allowance for each 1-Bank may be calculated and placed in fields 1831, and 1-Bank WASSO utilization may be calculated for each bank and placed in fields 1832. Accordingly, these values may be indicated as a percentage indicating the change of an assumed value of a load capacitance. Thus, depending on whether the change exceeds a threshold percentage, the 1-Bank utilization WASSO status may be indicated such as pass or fail for each bank and populated in fields 1833. Notably, each bank may have its own 1-bank SSO Allowance number, as populated in fields 1831, which may be the product of three scaling factors as previously described.

The effect of SSI may be added to the effect of SSO in the calculation of 1-Bank WASSO utilization in field 1832. For some implementations, it may be possible to account for the SSI effect of one input standard using the mV approach and another input standard using the SSI per power/ground pair approach. Notably, 1-Bank WASSO utilization in field 1832 may account for SSI, if SSI limits are specified for the input standard used. Otherwise, the effect of SSI may be accounted for by subtracting the content of field 1826 from a ground bounce limit 1786.

For a 2-Bank SSO Allowance and WASSO utilization, banks are combined as indicated by the bank 10/6 combination, or the bank 6/MT combination, or the bank MT/5 combination. Notably, the "MT" indicates the middle top meaning the combination of banks 1 and 3 in the above example. Thus, a 2-Bank SSO Allowance or a 2-Bank WASSO utilization may actually effectively be for more than two banks. These values may be calculated and a status provided in a similar manner to that described above for the 1-Bank SSO Allowance and WASSO utilization and status. However, a 2-Bank SSO Allowance may be set as a fixed value of a lowest adjacent 1-Bank SSO Allowance for field 1867. An example as described in more detail below may be to set the 2-Bank SSO Allowance to approximately 115% of the lowest adjacent 1-Bank SSO Allowance; however, other percentages may be used depending on the application. Additionally, 2-Bank WASSO utilization and status may be respectively populated in fields 1868 and 1869 for each bank or banks. Accordingly, WASSO utilization for an entire package may be calculated and populated in field 1834. Another field (not shown) may be added to account for ground bounce due to switching events in CLBs of an FPGA. As described above, it should be appreciated that by using a Sparse Chevron or other noise-reducing pin-out package type, total package WASSO utilization, such as may be calculated for field 1834, may not be needed for particular types of packages. Accordingly, package WASSO utilization may be provided for information purposes only.

For purposes of clarity by way of example and not limitation, particular numerical examples are provided below, though other values may be used. The first scaling factor is obtained by dividing 1 nH by the total inductance as determined in field 1739. The mutual inductance number of field 1738 is used to reduce the total inductance value. Thus, the equation for the first scaling factor may be an assumed total inductance value divided by an actual calculated total inductance value. An example of an assumed total inductance value may be approximately 1 nH.

The numerator used in calculating the second scaling factor is adjusted down by subtracting the ground bounce effects due to SSI in field 1826, the ground bounce effects due to input undershoot/overshoot in field 1830, and the ground bounce effects due to output undershoot/overshoot in field 1797. However, the numerator used in calculating the second scaling factor is adjusted up with the addition of the effects of phase shifting of field 1809 and virtual ground of field 1785. The net effective ground bounce budget of field 1787 is then divided by the 600 mV number. The equation for the second scaling factor may be effective ground bounce budget, as adjusted for noise effects, divided by the expected ground bounce level. An example of an expected ground bounce level may be approximately 600 mV.

Using example values for purposes of clarity an not limitation, the third scaling factor may be equal to:

$$\frac{600 \text{ mV}}{\left((22 \text{ pF} - 15 \text{ pF}) \times (Y)\frac{\text{mV}}{\text{pF}}\right) + 600 \text{ mV}} \quad (5)$$

which may yield $$\frac{600 \text{ mV}}{663 \text{ mV}},$$

or 0.905. Notably, Y, which is the effective capacitance derating factor, is determined from manufacturer's characterization data, and is shown in field 1819. This derating factor may alternatively be determined through other means such as calculations, graphs, and the like.

Field 1831, the 1-Bank SSO Allowance field, is the product of the three scaling factors, and the 1-Bank SSO utilization of field 1832 is the quantity of sum of the number of drivers used divided by the number of devices allowed per power and ground pair times the number of power and ground pairs in a bank for all driver types used and all input receiver types used.

Field 1867 for the 2-Bank SSO Allowance is set at percentage of the lowest 1-Bank SSO Allowance number between two adjacent banks, which is three adjacent banks in the case of "Middle Top" or "Middle Bottom" banks. Field 1868, the 2-Bank SSO utilization, is the sum of 1-Bank SSO utilization times the number of power and ground pairs in a bank for all adjacent banks involved divided by the sum all power and ground pairs in all banks involved.

Accordingly, this WASSO module provides flexibility to manage large differences in ground bounce limit from bank to bank. Moreover, ground bounce limit for each individual bank may be specified as described with reference to field 1786. In other words, a different ground bounce limit for each bank may be set instead of having a single limit applied to the entire package.

Notably, 1-Bank and 2-Bank parameters provide the ability to have distinctly different ground bounce limits, with differences as much as approximately 10 times as between two non-adjacent banks, namely two banks which are separated by at least one other bank. If the difference in limit is not large, such as approximately 2 times where the two banks are immediately adjacent to each other. Accuracy for calculation of ground bounce is enhanced, and thus control for levels below approximately 200 mV is provided. Differences in ground bounce levels may be accounted for with an output driver used for monitoring ground bounce. A fast driver will register higher ground bounce voltage levels than a slow driver. A derating factor can be determined from manufacturer's characterization data, graphs, formulas, or calculations. An optimal WASSO utilization may be obtained when the bank with the smallest ground bounce limit is diagonally across from the bank with the largest ground bounce limit.

To account for the effect of internal CLB switching on ground bounce, manufacturer's IC data may be used for parameters such as clock frequency, number of CLBs, LUTs, or flip-flops used, and percent toggle rate, among other known types of IC data. The effect of internal CLB switching on ground bounce may be greater at the center of the package and less at the periphery of the package. Additionally, distance away from a VCC internal pin may be taken into account. Refinement of calculations may be performed to account for differences in voltage levels between positive and negative excursions of internal ground bounce relative to an external reference ground. Notably, although ground bounce has been described, it should be appreciated by those of ordinary skill in the art that the same description is applicable to supply bounce. However, refinement of calculations to account for the amount of ground bounce may be done differently from accounting for the amount of supply voltage bounce. Although an example of FPGA I/O devices is used, it should be appreciated that any IC that uses drivers with different strengths and slew rates may be used, such as for example microprocessors, signal processors, graphics/image processors, and the like. Thus, any ground bounce or Vcc bounce parameter associated with or caused by activity of any circuit or function that resides within any IC is included.

FIGS. 15B-1 through 15B-6 collectively refer to a spreadsheet diagram depicting an exemplary embodiment of a user interface 1900 in accordance with another embodiment of the present invention. The user interface 1900 can be used with a design tool, e.g., a directional shift prediction module, capable of predicting directional shift in edges of a clock pulse. The user interface can be used to predict directional shift in an edge of a clock pulse within a user's proposed design to be implemented, and accordingly there will be logic implementation associated with the design for which jitter is to be accounted for. This logic implementation may be an instantiation of a design in programmable logic. Notably, some fields, which may be propagated in multiple locations of a user interface as noted above, have previously been described, and thus description of same is not repeated. Although three clock domains and three banks are used for purposes of example, fewer or more than three of each may be implemented.

Output logic implementation in an FPGA has been described above with reference to fields 1870, 1814 through 1816, and 1866 of FIG. 15B. Additionally, an output clock entry status may be displayed for each bank in fields 1906. A clock (C)/High Pulse (HP)/Low Pulse (LP) deviation reduction factor and quality of implementation may be specified by a user for each bank in fields 1908 and 1910, respectively. The quality of implementation may for example be generally characterized as being either poor, fair, or good.

WASSO utilization percentage may be used as in this example with reference to fields 1786, 1814 through 1816, 1831, 1832, 1870, and 1866 of FIG. 15B; or alternatively actual calculations based on the number of output drivers and input drivers, among other factors may be used. However, the WASSO utilization generally accounts for the different input and output driver device types, strengths, and quantities. The WASSO utilization value also generally accounts for acceptable ground bounce level, effects of virtual power and ground, and phase shifting, among other effects used to provide a WASSO utilization value.

A core logic implementation section may have multiple clock domains which are generally shown here as clocks 1, 2, and 3; however, fewer or more than three clock domains may be used. A name for each clock may be used for association in a design and provided by a user or loaded from an ISE database into fields 1902. Minimum clock frequency optionally may be specified by a user in fields 1903 for each clock domain, and a maximum clock frequency may be specified by a user or loaded from an ISE database into fields 1904 for each clock domain. A core clock entry status for each clock domain may be provided in fields 1901.

The number of flip-flops, including LUTs, driven by a rising edge of a clock signal and the number of flip-flops driven by a falling edge of a clock signal may be input by a user or loaded from an ISE database for each clock domain into fields 1905R and 1905F respectively. Clock enable duty cycles for rising and falling edge clock utilizations may be input by a user into fields 1907R and 1907F respectively. C/HP/LP deviation reduction scaling factors for rising and falling edge clock utilizations may be input by a user into fields 1909R and 1909F respectively. C/HP/LP deviation reduction quality of implementation (e.g., poor, fair, good) for rising and falling edge clock utilizations may be input by a user into fields 1911R and 1911F respectively.

Directional shift prediction for clocks may be done. In field 1961, a user can specify whether values for clock pulse (C), high pulse (HP), or low pulse (LP) will be calculated. A C/HP/LP deviation limit allowed by a user may be specified for each clock domain in fields 1934. C/HP/LP deviation status for each clock domain may be displayed in fields 1935. C/HP/LP deviation based on PDS peak, nominal, and minimum values may be calculated for respectively populating fields 1936 through 1938 for each clock domain with timing values, such as in picoseconds. C/HP/LP directional shift based on PDS peak, nominal, and minimum values may be calculated for respectively populating fields 1939 through 1941 for each clock domain based on unit intervals.

Field 1960 specifies the C/HP/LP period with respect to a minimum clock frequency with timing values, such as in picoseconds. Similarly, field 1962 specifies the C/HP/LP period with respect to a maximum clock frequency. Fields 1964 and 1966 specify the C/HP/LP periods with respect to minimum and maximum clock frequencies based upon unit intervals, denoted as "UI" within the FIGs.

Parameters for derived clocks and phase-shifted clocks may be calculated. For this example three phase-shifted clocks are used, although the number of phase-shifted clocks may be equivalent to the total number of clock domains. Thus, fewer or more than three phase-shifted clocks may be used.

In fields 1942, a user may specify an input clock source for each phase-shifted clock. Notably, the source clock may be any of the clocks specified in the domain and some clocks may be repeated for more than one type of phase-shifted clock. A user may select either a maximum or a minimum frequency for each clock in fields 1943. An input clock frequency may be calculated and placed in fields 1944.

A Digital Phase Shift (DPS) mode and DPS setting, which may be selected from any of a list of such settings, may be placed by a user for each phase-shifted clock domain into fields 1945 and 1946, respectively. A C/HP/LP deviation limit may be input by a user in fields 1947 for each phase-shifted clock domain. Accordingly, a determination may be made as to deviation status, namely whether the selected shift is within an acceptable limit, and a pass or fail indication may be placed for each phase-shifted clock domain in fields 1948. C/HP/LP deviation based on PDS, nominal, and minimum values may be calculated for respectively populating fields 1949 through 1951 for each phase-shifted clock domain with timing values, such as in picoseconds. C/HP/LP deviation based on PDS peak, nominal, and minimum values may be calculated for respectively populating fields 1952 through 1954 for each phase-shifted clock domain based on unit intervals. Fields 1960 through 1966 may be calculated as previously described.

The fields described with reference to FIG. 15B-4 for derived/phase shifted clocks can be used in scaling the final measure of directional shift. For example, the fields 1942-1954, 1960, 1962, 1964, and 1966 can be used in scaling the final measure of directional shift as described with reference to step 1465 of FIG. 14.

Notably, fields 1786, 1831 and 1832 have been previously described, and thus values for populating these fields may be replicated here. Maximum and minimum serial bit rates for output logic may be calculated for each clock domain and populated in fields 1913 and 1914, respectively. An effective ground bounce level may be calculated for each clock domain and populated in fields 1915. Fields 1913, 1914, 1786, 1831, 1832, and 1915 as shown in FIG. 15B-5, for example, may be used in identifying I/O bank usage of the circuit design as described with reference to step 1445 of FIG. 14.

Rising and falling edge clock bit rates may be separately calculated for population of fields. For example, a minimum serial bit rate, a maximum serial bit rate, and an effective number of flip-flops driven may be calculated for rising-edge triggered clocking for population of fields 1916R, 1917R, and 1918R, respectively. Moreover, a minimum serial bit rate, a maximum serial bit rate, and an effective number of flip-flops driven may be calculated for falling-edge triggered clocking for population of fields 1916F, 1917F, and 1918F, respectively. Fields 1916R, 1916F, 1917R, 1917F, 1918R, and 1918F of FIG. 15B-5 may be used in determining the operational frequency of the reference and aggressor clocks as described with reference to step 1430 of FIG. 14.

Effective core logic utilization and switching may be calculated for SDR and DDR applications. For example, minimum single-edge serial bit rate, maximum single-edge serial bit rate, and an effective number of flip-flops switching on a single edge of a clock signal may be calculated for each clock domain for respective population of fields 1919 through 1921. Moreover, minimum double-edge serial bit rate, maximum double-edge serial bit rate, and an effective number of flip-flops switching on both edges of a clock signal may be calculated for respective population of fields 1922 through 1924 for each clock domain. Fields 1919-1924 of FIG. 15B-6, for example, may be used in determining CLB usage within the circuit design as described with reference to step 1435 of FIG. 14.

Summation of CLB directional shift induced by all clocks, including phase-shifted clocks, may be calculated and placed into fields 1929. Contribution due to coincident occurrence of clocks may be taken into account for this calculation.

Directional shift components may be calculated for each CLB block module induced by a respective clock signal. Again, only three clock domains are described; however, it should be appreciated that fewer or more than three clock domains may be implemented. CLB directional shift induced by clock signals 1 through 3 may be specified for each clock in fields 1926 through 1928, respectively. Notably, though not illustratively shown in the exemplary user interface of FIG. 15B-6, fields 1926 through 1928 may be broken out into four separate categories. For example, CLB directional shift may be calculated for single-edge switching separately from double-edge switching. Additionally, CLB directional shift may be calculated for clocks operating at their minimum frequency separately from clocks operating at their maximum frequency. Using these four separate subcategories, four sets of fields 1926 through 1928 may be generated with a set of separate summation fields 1929 for each of the four sets. Notably, quadratic or another form of summation may be done for each clock domain. Fields 1926-1928 of FIG. 15B-6 can correspond to the measure of directional shift induced by CLBs onto the reference clock as described with reference to step 1440 of FIG. 14.

Additionally, a sum of all SSO directional shift induced by all clock signals may be calculated for each bank and placed into fields 1933. SSO directional shift induced by each clock signal may be calculated for each bank and placed in fields 1930 through 1932. Notably, though not illustratively shown in the exemplary user interface of FIG. 15B-6, fields 1930 through 1932 may be broken out into separate categories for directional shift due to minimum frequency of a clock causing SSO switching and due to maximum frequency of a clock causing SSO switching. A quadratic or other form of summation of all SSO directional shift induced by all clock signals may be calculated for each bank and placed in fields 1933. This sum may be done separately for minimum frequency clocking and maximum frequency clocking, and a summation may be done for each clock domain. Fields 1930-1932 can correspond to the level of directional shift induced by I/O banks onto the reference clock as described with reference to step 1450 of FIG. 14.

Notably, the directional shift prediction module can use a sum of what is indicated as SSO. However, this SSO calculation is based on the WASSO. Notably, the WASSO takes into account SSI. Accordingly, SSO, as calculated within a directional shift predictor module, can take into account both SSO and SSI. Furthermore, directional shift values calculated within the directional shift predictor module may be included in a place and route software tool for placement and routing where directional shift is taken into account.

In summary, prediction of directional shift can employ such parameters as minimum and maximum clock frequency, clock enable duty cycle, a C/HP/LP deviation reduction factor, a C/HP/LP deviation reduction quality of implementation, and a number of CLBs, LUTs, or flip-flops used to calculate the amount of directional shift expected from a user's design. The amount of directional shift predicted could be any number of types, including: clock period, high pulse, and low pulse. The effective data toggle frequency may be calculated based on clock frequency and clock enables, and whether rising, falling, or both rising and falling clock edges are used. Notably, a logic block may have multiple clocks, multiple clock enables, and multiple staggered clock enables.

Additionally, differences in directional shift as a result of phase shifting, which could be based on manufacturer's characterization data, calculations, graphs, curves, and the like may be taken into account. Phase shift parameters include clock frequency, shift mode, and the value of phase offset. Moreover, differences in directional shift as a function of variation in temperature (e.g., scaling factor percentage variation or picoseconds of directional shift per degree Celsius), or voltages (e.g., scaling factor percentage variation or picoseconds of directional shift per mV of supply variation), as determined by manufacturer's characterization data, calculations, formula, curves, graphs, and the like, may be accounted for. Additionally, it should be appreciated that timing closure with an FPGA place and route tool may be obtained by providing system directional shift numbers that are used as part of the router's timing constraints.

It should be appreciated that directional shift may be determined from scaling the number of LUTs or flip-flops used in a user's design against the number of LUTs or flip-flops used in manufacturer's characterization. Directional shift values may be determined by looking up manufacturer's characterization data, by interpolation of such data, by insertion and replication of such data, by mathematical computation of formula, and the like. Though only CLB blocks and I/O blocks have been described, it should be appreciated that noise of other circuitry on the FPGA, including microprocessors, microcontrollers, DCMs, Digital Frequency Shifters, Phase-Locked Loops, Digital Phase Shifters, Phase-Matched Clock Dividers, BRAMs, DSPs, and MGTs, among other types of known circuits may likewise be addressed. As noted, directional shift values may be scaled up or down according to whether the data reflects a best or worst case scenario in terms of directional shift. The scaling can be performed on a per circuit element basis in either direction. Furthermore, although an example of an FPGA is used, any other IC having noise, such as a CPU, microprocessor, signal processor, image processor, or network processor, among other known types of ICs may be used.

Accordingly, predictions or estimates of clock or output directional shift that is caused by noise generated by an IC device itself as a result of internal logic switching or output driver switching may be obtained. Such generated noise may be affected by PDS response of discrete capacitors on the PCB, buried capacitance on the PCB, discrete capacitors on the package substrate, buried capacitance on package substrate, and embedded capacitance in the IC die. Directional shift prediction and planning can be applicable to any timing parameter associated with or caused by a circuit. Moreover, one or more than one clock domains may be accounted for.

Figures 1, 16:
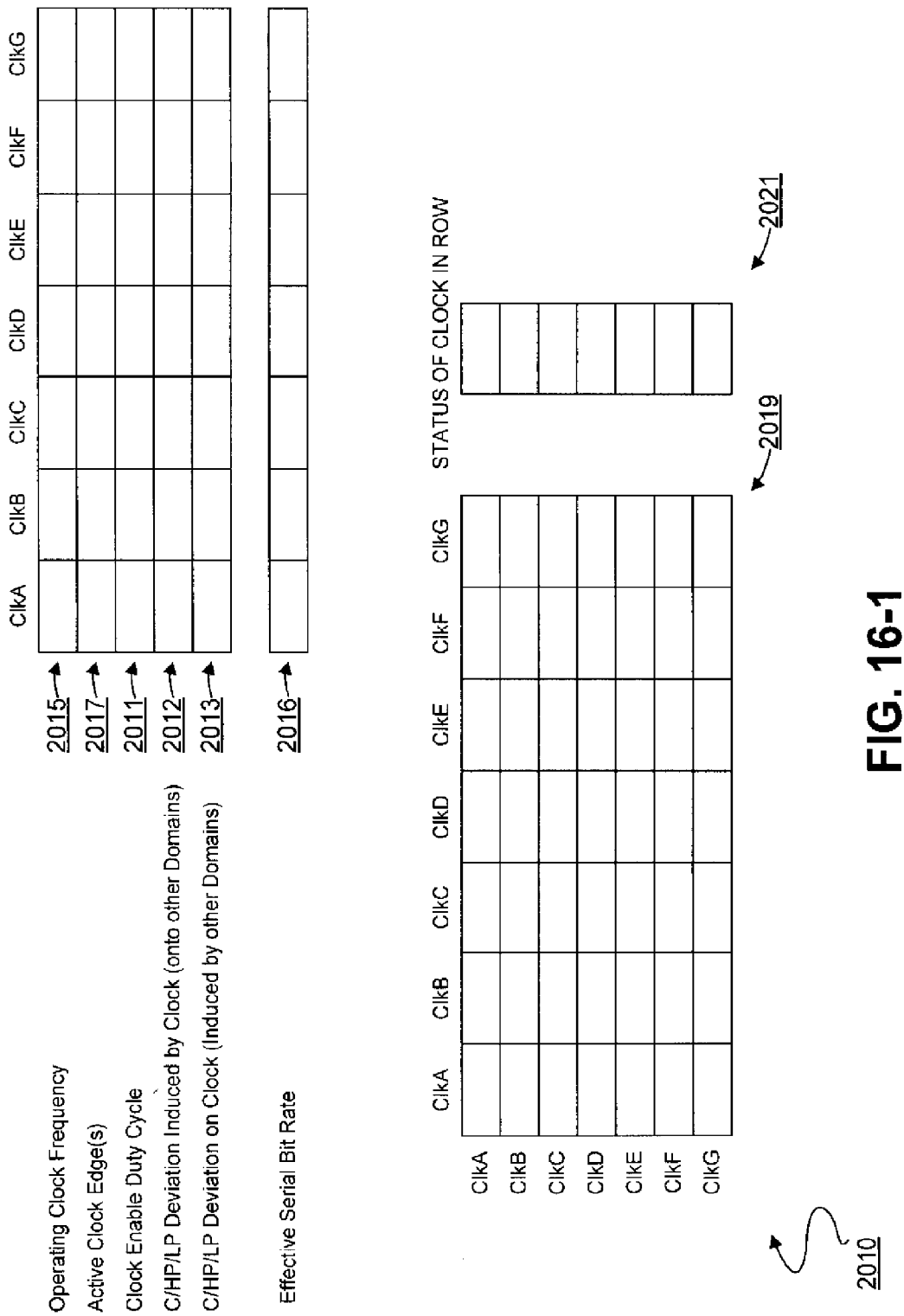
Figures 2, 16:
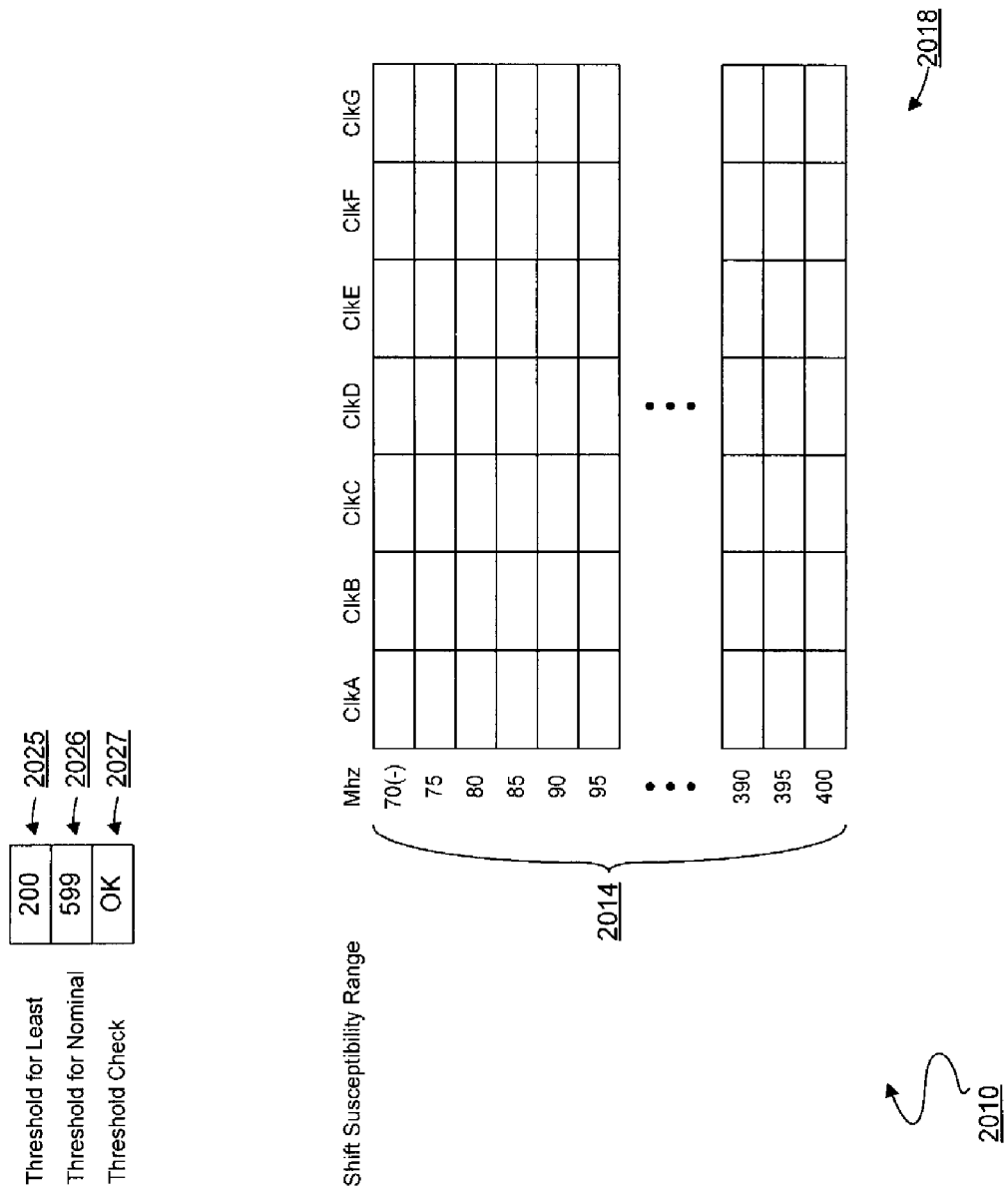

FIGS. 16-1 and 16-2, taken collectively, refer to a spreadsheet diagram depicting an exemplary user interface 2010 that can be utilized in conjunction with a clock planning module. The user interface 2010, and thus the clock planning module, may include operating clock frequency fields 2015 and active clock edge(s) field 2017 for input by a user here. Notably, frequency of operation of clocks gives an indication of how often switching events may occur, and thus this information may be used for determining directional shift, including predicting directional shift.

Even though seven clock domains, namely domains ClkA through ClkG, are illustratively shown, fewer or more than seven clock domains may be used. The clock enable duty cycle can be specified in fields 2011. C/HP/LP deviation induced by a selected clock onto other clock domains may be determined for population in fields 2012. C/HP/LP deviation on a clock induced by other clocks may be determined for population of fields 2013. Deviation for fields 2012 through 2013 need not be expressed as a quantity, but may be expressed as a relative quantitative term, such as "little," "low," "high," and "most" for example. Effective serial bit rate for each clock may be calculated for populating fields 2016. Moreover, a clock domain by clock domain array 2019 may provide a status 2021, such as logic high or low, of each clock signal. Field 2012, for example, can correspond to step 1345 of FIG. 13. Field 2013 can correspond to step 1350 of FIG. 13.

A directional shift susceptibility array 2018 also can be included. A directional shift susceptibility range 2014, such as from 70 to 400 Mhz, may be provided for each clock domain in 5 Mhz increments. Of course, other directional shift susceptibility ranges, as well as other increments, may be used. Directional shift susceptibility array 2018 may indicate within which portions of directional shift susceptibility range 2014 directional shift is least, more, and most susceptible to other bit rates operating at an indicated frequency range. The directional shift susceptibility array 2018 can correspond to step 1355 of FIG. 13.

The user interface 2010, in conjunction with the design tool, can provide a means to visually display a range of clock frequencies where directional shift is least, nominal, and most. This is may be done based on manufacturer's characterization data, or may be done through other means such as calculations, charts, graphs, and the like. "Least," "nominal," and "most" may be generally defined as less than approximately 200 ps, approximately 200-599 ps, and greater than 600 ps, respectively. Field 2025 of FIG. 16-2, for example, allows a user to specify the upper bound for the classification of "least." Field 2026 allows a user to specify an upper bound for the "nominal" classification. Any directional shift greater than the upper bound for the nominal classification can be considered "most." The threshold check field 2027 can compare the specified thresholds to ensure that the threshold for nominal 2026 is greater than the threshold for least 2025. Values determined from the datasets can be compared with the thresholds. Based upon a comparison of data obtained from the datasets with the thresholds, e.g., fields 2025 and 2026, fields of the susceptibility array 2018 can be colored to indicate where within the ranges a given field falls.

Notably, examples of I/O Standards that may be used include TTL, GTL, HSTL, SSTL, PECL, BLVDS, GTL, GTLP, PCI, CMOS, and DCI, as well as known variations thereof, such as low voltage versions, among other known interface standards. Additionally, the maximum number of SSOs for each power/ground pair may vary from manufacturer to manufacturer. With respect to Sparse Chevron packages, as well as other configurations for increasing the number of power/ground pairs in proximity to signal pins, the maximum number of SSOs per power/ground pair may be higher.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, magneto-optical media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A computer-implemented method of predicting a clock period within an integrated circuit, the method comprising:
   selecting a type of directional shift for which a measure is to be determined;
   selecting a data set in response to the selected type of directional shift;
   determining configuration information for an integrated circuit, wherein the configuration information specifies a circuit design to be implemented within the integrated circuit;
   determining from the configuration information, a resource usage level of the circuit design as a function of resources of the integrated circuit used by the circuit design versus resources available on the integrated circuit;
   determining, by a computer, at least one measure of directional shift for an edge of a pulse of a reference clock signal of the circuit design for the integrated circuit induced by at least one other clock signal of the circuit design for the integrated circuit according to the configuration information;
   wherein the determining of the measure of directional shift includes determining the measure of directional shift from the selected data set according to the resource usage level; and
   outputting the measure of directional shift of the edge of the pulse of the reference clock signal.

2. The computer-implemented method of claim 1, further comprising estimating a period for the reference clock signal according to the measure of directional shift.

3. The computer-implemented method of claim 1, wherein determining at least one measure of directional shift comprises determining a measure of left shift.

4. The computer-implemented method of claim 3, further comprising estimating a minimum period of the reference clock signal according to the measure of left shift.

5. The computer-implemented method of claim 1, wherein determining at least one measure of directional shift comprises determining a measure of right shift.

6. The computer-implemented method of claim 5, further comprising estimating a maximum period of the reference clock signal according to the measure of right shift.

7. The computer-implemented method of claim 1, wherein determining at least one measure of directional shift comprises determining a measure of input/output bank induced directional shift for the edge of the reference clock signal that depends upon a number of input/output banks in a same clock domain as the reference clock signal.

8. The computer-implemented method of claim 1, wherein determining at least one measure of directional shift comprises determining a measure of configurable logic block induced directional shift for the edge of the reference clock signal that depends upon a number of configurable logic blocks driven by the reference clock signal.

9. The computer-implemented method of claim 1, wherein the circuit design specifies resources of the integrated circuit used by the circuit design versus available resources of the integrated circuit.

10. The computer-implemented method of claim 1, further comprising determining a measure of directional shift for at least one of a low pulse or a high pulse of the reference clock signal.

11. A computer-implemented method of predicting directional shift of a clock edge within an integrated circuit, the method comprising:

obtaining clock frequencies of clock signals of a circuit design to be implemented within an integrated circuit;

obtaining clock enable duty cycles in association with the clock frequencies;

receiving a user selection of a selected edge of a pulse of at least one clock signal;

determining a resource usage level of the circuit design as a function of resources of the integrated circuit used by the circuit design versus resources available on the integrated circuit;

determining, using a computer, directional shifts of the selected edge of the pulse of the at least one clock signal, at least in part, responsive to the clock enable duty cycles and the clock frequencies;

wherein the determining of the directional shifts includes determining the directional shifts according to the resource usage level; and outputting an indication of the directional shift of the pulses of the clock signals in association with the clock frequencies.

12. The computer-implemented method of claim 11, further comprising selecting the directional shift to be left shift of the selected edge.

13. The computer-implemented method of claim 11, further comprising selecting the directional shift to be right shift of the selected edge.

14. The computer-implemented method of claim 11, further comprising:

determining an effective serial bit rate for each of the clock frequencies; and generating a clock edge directional shift susceptibility array for the clock frequencies over a selected range of clock frequencies, wherein the clock edge directional shift susceptibility array indicates which frequency ranges for clocks of the circuit design have a selected effect upon other clocks of the circuit design.

15. The computer-implemented method of claim 14, further comprising setting a threshold to which at least one item of the clock edge directional shift susceptibility array is compared.

16. The computer-implemented method of claim 11, further comprising indicating a status of at least one of a deviation induced by one clock onto a plurality of other clocks or a deviation induced by a plurality of clock domains onto a selected clock.

17. A non-transitory computer-readable medium having computer-usable instructions thereon for performing a method of predicting a clock period within an integrated circuit, the method comprising:

selecting a type of directional shift for which a measure is to be determined;

selecting a data set in response to the selected type of directional shift;

determining configuration information for an integrated circuit, wherein the configuration information specifies a circuit design to be implemented within the integrated circuit;

determining from the configuration information, a resource usage level of the circuit design as a function of resources of the integrated circuit used by the circuit design versus resources available on the integrated circuit;

determining at least one measure of directional shift for an edge of a pulse of a reference clock signal of the circuit design of the integrated circuit induced by at least one other clock signal of the circuit design for the integrated circuit according to the configuration information;

wherein the determining of the measure of directional shift includes determining the measure of directional shift from the selected data set according to the resource usage level; and outputting the measure of directional shift for the edge of the pulse of the reference clock signal.

18. The computer-readable medium of claim 17, wherein the circuit design specifies resources of the integrated circuit used by the circuit design versus available resources of the integrated circuit.

19. The computer-readable medium of claim 17, wherein determining at least one measure of directional shift comprises determining a measure of left shift, wherein the estimating the period of the reference clock signal comprises determining a minimum period of the reference clock signal according to the measure of left shift.

20. The computer-readable medium of claim 17, wherein determining at least one measure of directional shift comprises determining a measure of right shift, wherein the estimating the period of the reference clock signal comprises determining a maximum period of the reference clock signal according to the measure of right shift.

\* \* \* \* \*